(12) United States Patent
Jibrin

(10) Patent No.: US 12,206,773 B2
(45) Date of Patent: *Jan. 21, 2025

(54) SYSTEM, METHOD, AND DEVICE FOR VITALITY VERIFICATION USING A BIOMETRIC ONE-TIME PASSCODE

(71) Applicant: Ismail Jibrin, Phoenix, AZ (US)

(72) Inventor: Ismail Jibrin, Phoenix, AZ (US)

( * ) Notice: Subject to any disclaimer, the term of this patent is extended or adjusted under 35 U.S.C. 154(b) by 338 days.

This patent is subject to a terminal disclaimer.

(21) Appl. No.: 17/734,879

(22) Filed: May 2, 2022

(65) Prior Publication Data

US 2022/0263653 A1 Aug. 18, 2022

Related U.S. Application Data

(63) Continuation-in-part of application No. 17/109,734, filed on Dec. 2, 2020, now Pat. No. 11,323,261.

(60) Provisional application No. 62/944,729, filed on Dec. 6, 2019.

(51) Int. Cl.
*H04L 29/06* (2006.01)
*H04L 9/08* (2006.01)

(52) U.S. Cl.
CPC .......... *H04L 9/0863* (2013.01); *H04L 9/0866* (2013.01); *H04L 9/0872* (2013.01); *H04L 2463/121* (2013.01)

(58) Field of Classification Search
CPC ... H04L 9/0863; H04L 9/0866; H04L 9/0872; H04L 9/3231; H04L 63/0838; H04L 63/0861
See application file for complete search history.

(56) References Cited

U.S. PATENT DOCUMENTS

| 10,693,872 | B1 | 6/2020 | Larson |
| 2006/0219776 | A1 | 10/2006 | Finn |
| 2014/0201537 | A1* | 7/2014 | Sampas .................. H04N 23/23 713/186 |

(Continued)

FOREIGN PATENT DOCUMENTS

| KR | 20110040201 | 4/2011 |
| KR | 20180114775 | 10/2018 |

(Continued)

*Primary Examiner* — Shawnchoy Rahman
(74) *Attorney, Agent, or Firm* — Booth Udall Fuller, PLC; Pacer K. Udall

(57) ABSTRACT

A system, method, and token for vitality verification is disclosed. The token includes a biometric sensor configured to obtain a token reading of an individual, a clock module, and a memory including a cryptographic key and an enrollment reading of the individual. The token also includes a one-time passcode (OTP) generator, and a processor communicatively coupled to the biometric sensor, the clock module, the memory, and the OTP generator. The processor is configured to determine a vitality of the individual at the time the token reading was obtained, compare the token reading with the enrollment reading, and generate, in response to the token reading matching the enrollment reading and determining the vitality of the individual, a token OTP string including a token OTP generated by the OTP generator by applying a one-way function to a token message including the cryptographic key, the enrollment reading, and a timestamp.

34 Claims, 6 Drawing Sheets

(56) References Cited

U.S. PATENT DOCUMENTS

2016/0071371 A1* 3/2016 Pececnik ............. G07F 17/3248
                                                              463/25
2016/0269402 A1    9/2016 Carter
2017/0024554 A1    1/2017 Segal

FOREIGN PATENT DOCUMENTS

WO       WO-0133359 A1 *  5/2001  ............... G06F 8/20
WO         2020082164     4/2020

* cited by examiner

SYSTEM, METHOD, AND DEVICE FOR VITALITY VERIFICATION USING A BIOMETRIC ONE-TIME PASSCODE

RELATED APPLICATIONS

This application is a continuation-in-part of U.S. patent application Ser. No. 17/109,734, filed Dec. 2, 2020 titled "System, Method, And Device for Vitality Verification Using a Biometric One-Time Passcode," which claims the benefit of U.S. Provisional Patent Application No. 62/944,729, filed Dec. 6, 2019 titled "System, Method, and Device for Vitality Verification Using a Biometric One-Time Passcode," the entirety of the disclosures of which are hereby incorporated by this reference.

TECHNICAL FIELD

Aspects of this document relate generally to vitality verification using a biometric one-time passcode.

BACKGROUND

The provision of benefits often brings help to those who need it the most, whether due to age, health, or other circumstances. Because these needs are so common, their provisioning often occurs on a massive scale. Examples include the Social Security Administration, retirement programs, pensions, disability programs, and unemployment benefits. The large numbers of recipients in these programs has left them vulnerable to waste and even fraud, when benefits are being provided even though the intended recipient has died. Conventional methods for verifying whether the intended recipient is still alive are time consuming, and cannot be performed at the scale needed to reduce the loss of millions of dollars each year.

SUMMARY

According to one aspect, a vitality verification token includes a biometric sensor configured to obtain a token biometric reading of an individual, a first clock module, and a memory including a cryptographic key and an enrollment biometric reading of the individual. The enrollment biometric reading was obtained previously through the biometric sensor. The token also includes a first one-time passcode (OTP) generator, a token interface, and a processor communicatively coupled to the biometric sensor, the first clock module, the memory, the first OTP generator and the token interface. The processor is configured to determine, based at least in part on the token biometric reading, if the individual is alive at the time the token biometric reading is obtained. The processor is also configured to compare the token biometric reading with the enrollment biometric reading, and generate, in response to the token biometric reading matching the enrollment biometric reading and determining that the individual was alive at the time the token biometric reading was obtained, a token OTP string including at least a portion of the first timestamp and a token OTP generated by the first OTP generator. The first OTP generator applies a one-way function to a token message including the cryptographic key, the enrollment biometric reading, and a first timestamp from the clock module. The processor is also configured to output the token OTP string through the token interface. The token OTP string is between six and ten characters in length.

Particular embodiments may comprise one or more of the following features. The vitality verification token may also include a GPS receiver communicatively coupled to the processor. The processor may be further configured to determine a location using the GPS receiver. One of the token OTP string and the token message may also include the location. The memory may also include a unique identifier associated with the individual, a plurality of additional enrollment biometric readings, and a plurality of additional unique identifiers. Each additional biometric reading and additional unique identifier may be associated with a different individual from a plurality of additional individuals associated with the vitality verification token. The token OTP string may also include the unique identifier.

According to another aspect of the disclosure, a vitality verification token includes a biometric sensor configured to obtain a token biometric reading of an individual, a first clock module, and a memory including a cryptographic key and an enrollment biometric reading of the individual. The enrollment biometric reading is obtained previously through the biometric sensor. The token also includes a first one-time passcode (OTP) generator, a token interface, and a processor communicatively coupled to the biometric sensor, the first clock module, the memory, the first OTP generator and the token interface. The processor is configured to determine if the individual is alive at the time the token biometric reading was obtained, compare the token biometric reading with the enrollment biometric reading, and generate, in response to the token biometric reading matching the enrollment biometric reading and determining that the individual was alive at the time the token biometric reading was obtained, a token OTP string including a token OTP generated by the first OTP generator. The first OTP generator applies a one-way function to a token message including the cryptographic key, the enrollment biometric reading, and a first timestamp from the clock module. The processor is also configured to output the token OTP string through the token interface.

Particular embodiments may comprise one or more of the following features. The determination of whether the individual was alive at the time the token biometric reading was obtained may be made based, at least in part, on the token biometric reading. The vitality verification token may also include a GPS receiver communicatively coupled to the processor. The processor may be further configured to determine a location using the GPS receiver. One of the token OTP string and the token message may also include the location. The memory may also include a unique identifier associated with the individual, a plurality of additional enrollment biometric readings, and a plurality of additional unique identifiers. Each additional biometric reading and additional unique identifier may be associated with a different individual from a plurality of additional individuals associated with the vitality verification token. The token OTP string may also include the unique identifier.

According to yet another aspect of the disclosure, a vitality verification token includes at least one biometric sensor configured to obtain a token biometric reading of an individual, a first clock module, and a memory including a cryptographic key and an enrollment biometric reading of the individual. The token also includes a first one-time passcode (OTP) generator and a processor communicatively coupled to the biometric sensor, the first clock module, the memory, and the first OTP generator. The processor is configured to determine, using at least one of the at least one biometric sensor, a vitality of the individual at the time the token biometric reading was obtained, the vitality being one of alive or dead. The processor is also configured to compare the token biometric reading with the enrollment biometric reading, and generate, in response to the token biometric reading matching the enrollment biometric reading and determining the vitality of the individual at the time the token biometric reading was obtained, a token OTP string including a token OTP generated by the first OTP generator. The first OTP generator applies a one-way function to a token message including the cryptographic key, the enrollment biometric reading, and a first timestamp from the clock module.

Particular embodiments may comprise one or more of the following features. The processor may be further configured to only generate the token OTP string if the individual is determined to be dead. The processor may be further configured to only generate the token OTP string if the individual is determined to be alive. One of the token OTP string and the token message may also include the vitality. The vitality verification token may also include a GPS receiver communicatively coupled to the processor. The processor may be further configured to determine a location using the GPS receiver. One of the token OTP string and the token message may also include the location. The memory may also include a unique identifier associated with the individual, a plurality of additional enrollment biometric readings, and a plurality of additional unique identifiers. Each additional biometric reading and additional unique identifier may be associated with a different individual from a plurality of additional individuals associated with the vitality verification token. The token OTP string may also include the unique identifier. The token OTP string may also include at least a portion of the first timestamp. The token OTP string may be between six and ten characters in length. The memory of the vitality verification token may also include a unique identifier associated with the individual. The token OTP string may also include the unique identifier.

According to another aspect of the disclosure, a system for vitality verification includes a vitality verification token having a processor, a memory, at least one biometric sensor, a first one-time passcode generator, a first clock module, and a token interface. The vitality verification token is configured to obtain a token biometric reading of an individual through at least one of the at least one the biometric sensor, and compare the token biometric reading with an enrollment biometric reading of the individual. The enrollment biometric reading is stored in the memory of the vitality verification token. The token is also configured to determine, using at least one of the at least one biometric sensor, a vitality of the individual at the time the token biometric reading was obtained, the vitality being one of alive or dead. The token is further configured to generate, using the first OTP generator and in response to the token biometric reading matching the enrollment biometric reading and determining the vitality of the individual at the time the token biometric reading was obtained, a token one-time passcode (OTP) string including a token OTP generated by applying a one-way function to a token message. The token message includes a cryptographic key stored in the memory, the enrollment biometric reading, and a first timestamp from the clock module. The system also includes a vitality verification server including a second one-time passcode generator, a second clock module, and at least one server interface. The vitality verification server is configured to receive through one of the at least one server interfaces the token OTP string provided by the vitality verification token through the token interface. The server is also configured to generate, using the second OTP generator, a server OTP by applying the one-way function to a server message. The server message includes the cryptographic key stored in a user file, the enrollment biometric reading stored in the user file, and a second timestamp. The user file is retrieved using at least one of a unique identifier associated with the individual and an origination point of the token OTP string. The server is also configured to verify the vitality of the individual by comparing the server OTP with the token OTP.

Particular embodiments may comprise one or more of the following features. The processor may be further configured to only generate the token OTP string if the individual is determined to be dead. The processor may be further configured to only generate the token OTP string if the individual is determined to be alive. One of the token OTP string and the token message may also include the vitality. The vitality verification token may also include a GPS receiver. The vitality verification token may be further configured to determine a location using the GPS receiver. One of the token OTP string and the token message may also include the location. If the token message includes the location, the server message may include the location. The location may be stored in the user file. The memory may also include a unique identifier associated with the individual, a plurality of additional enrollment biometric readings, and a plurality of additional unique identifiers. Each additional biometric reading and additional unique identifier may be associated with a different individual from a plurality of additional individuals associated with the vitality verification token. The token OTP string may also include the unique identifier. The token OTP string may also include at least a portion of the first timestamp. The token OTP string may be between six and ten characters in length. The memory of the vitality verification token may also include a unique identifier associated with the individual. The token OTP string may also include the unique identifier.

According to yet another aspect of the disclosure, a method for vitality verification includes obtaining a token biometric reading of an individual through a biometric sensor of a vitality verification token. The vitality verification token includes a processor, a memory, at least one biometric sensor, a first one-time passcode generator, a first clock module, and a token interface. The method also includes comparing the token biometric reading with an enrollment biometric reading of the individual. The enrollment biometric reading is stored in the memory of the vitality verification token. The method further includes determining, using at least one of the at least one biometric sensor, a vitality of the individual at the time the token biometric reading was obtained, the vitality being one of alive or dead. The method includes generating, using the first OTP generator and in response to the token biometric reading matching the enrollment biometric reading and determining the vitality of the individual at the time the token biometric reading was obtained, a token one-time passcode (OTP) string including a token OTP generated by applying a one-way function to a token message. the token message includes a cryptographic key stored in the memory, the enrollment biometric reading, and a first timestamp from the clock module. The method also includes receiving the token OTP string at a vitality verification server through one of at least one server interface of the vitality verification server. The token OTP string is provided through the token interface. The vitality verification server further includes a second one-time passcode generator and a second clock module. The method includes retrieving a user file associated using at least one of the token OTP string and an origination point of the token OTP string. The user file includes the cryptographic key and the enrollment biometric reading. The method further includes generating, using the second OTP generator, a server OTP by applying the one-way function to a server message. The server message includes the cryptographic key stored in the user file, the enrollment biometric reading stored in the user file, and a second timestamp. The method also includes verifying the vitality of the individual by comparing the server OTP with the token OTP.

Particular embodiments may comprise one or more of the following features. The token OTP string may be only generated if the individual is determined to be dead. The token OTP string may be only generated if the individual is determined to be alive. One of the token OTP string and the token message may also include the vitality. The method may also include determining a location through a GPS receiver of the vitality verification token. One of the token OTP string and the token message may also include the location. If the token message includes the location, the server message may include the location. The location may be stored in the user file. The memory may also include a unique identifier associated with the individual, a plurality of additional enrollment biometric readings, and a plurality of additional unique identifiers. Each additional biometric reading and additional unique identifier may be associated with a different individual from a plurality of additional individuals associated with the vitality verification token. The token OTP string may also include the unique identifier. The user file may be retrieved using the unique identifier. The token OTP string may also include at least a portion of the first timestamp. The token OTP string may be between six and ten characters in length. The memory of the vitality verification token may also include a unique identifier associated with the individual. The token OTP string may also include the unique identifier. The user file may be retrieved using the unique identifier.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1A:
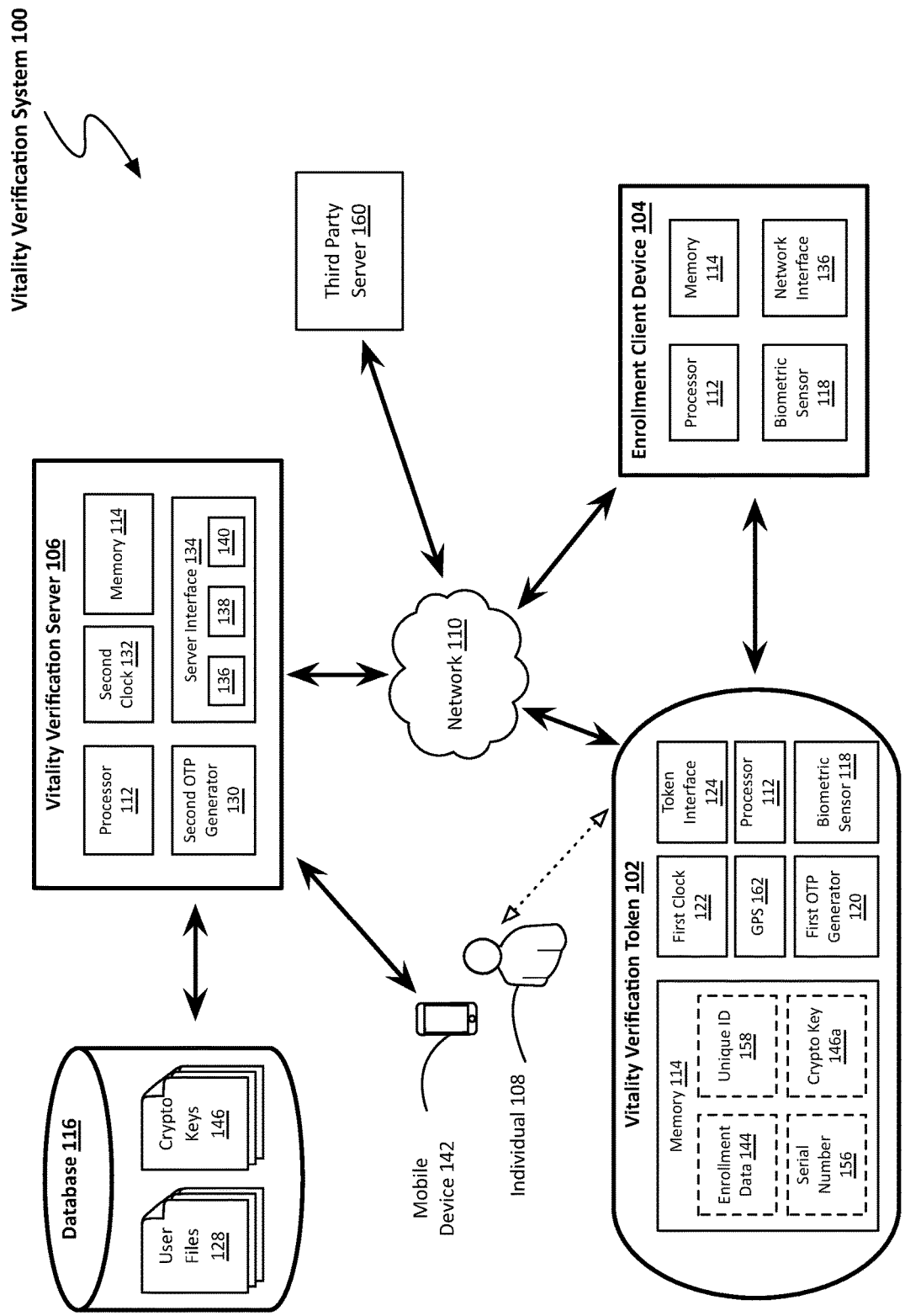
FIG. 1A is a schematic view of a vitality verification system.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The provision of benefits often brings help to those who need it the most, whether due to age, health, or other circumstances. Because these needs are so common, their provisioning often occurs on a massive scale. Examples include the Social Security Administration, retirement programs, pensions, disability programs, and unemployment benefits. The large numbers of recipients in these programs has left them vulnerable to waste and even fraud, when benefits are being provided even though the intended recipient has died. Conventional methods for verifying whether the intended recipient is still alive are time consuming and cannot be performed at the scale needed to reduce the loss of millions of dollars each year.

Contemplated herein is a system, method, and device for vitality verification using a biometric one-time passcode. Rather than relying on conventional methods for determining if the recipient of a benefit is still living, the systems and methods contemplated herein rely on a vitality verification token that generates a one-time passcode based, in part, on a biometric reading performed by the token. At the time of the reading, the token also determines the vitality of the biometric source. After determining the reading came from a living individual, and that the reading matches the reading made when the individual was enrolled, a one-time passcode (hereinafter OTP) is generated. Presentation of the OTP to a vitality verification server verifies that the individual is still living, authorizing release of the benefit for an additional period of time.

The systems, methods, and devices contemplated herein are advantageous over conventional methods for reducing waste and fraud in a benefit system for a number of reasons. The technology is proven and inexpensive. It is much more accurate than the conventional method of a phone call, where the identity of the individual may be difficult to verify. It is also much more efficient than making in-person visits. The devices themselves are inexpensive, particularly in light of the savings they will provide by reducing waste and fraud.

It should be noted that, while the following discussion is made in the context of verifying the vitality of an individual to authorize continued receipt of a benefit, this system, method, and device may be adapted for us in other contexts requiring proof of life, or as an additional layer of security (i.e. biometric) for a OTP token being used in a conventional manner.

FIG. 1 is a schematic view of a non-limiting example of a vitality verification system 100. As shown, the vitality verification system 100 (hereinafter "system 100") comprises a vitality verification server 106 (hereinafter "server 106"), and a vitality verification token 102 (hereinafter "token 102"). Some embodiments may also comprise an enrollment client device 104. According to various embodiments, the token 102 takes a biometric scan of an individual 108, generates a one-time passcode based, at least in part, on the biometric scan, and sends the passcode to the server 106 to be compared with a passcode generated by the server 106. If they match, vitality has been verified to the benefit provider, and the benefit is authorized for another period of time.

In the context of the present description and claims that follow, a vitality verification token 102 (hereinafter "token 102") is a device capable of detecting a biometric signal or property innate to an individual, and further capable of generating a one-time passcode based, in part, on that biometric reading. Unlike conventional OTP tokens, which are used to provide access or login credentials, the token 102 contemplated herein is not designed to operate solely as a security device. It operates independently and is used to verify that an individual 108 associated with the token 102 is living and has provided a biometric scan. In some embodiments, the contemplated token 102 may also be used to generate one-time passcodes for access to digital systems, based at least in part on a biometric reading. In other embodiments, the use of biometric data to verify the presence and vitality of an individual may be advantageous in scenarios where identity and presence need to be verified (e.g., examination halls, election polling stations, etc.).

As shown, the token 102 comprises a processor 112, a memory 114, a first clock module 122ab, at least one token interface 124, at least one biometric sensor 118, and a first OTP generator 120, according to various embodiments. Each of these elements will be discussed below. In some embodiments, the token 102 may be battery operated, and may use rechargeable batteries. In other embodiments, the token 102 may be powered by an external power supply.

The token 102 comprises at least one biometric sensor 118. In the context of the present description and the claims that follow, a biometric sensor 118 is a sensor capable of detecting, measuring, or capturing one or more characteristics that are both intrinsic and unique to an individual 108. Some embodiments of the token 102 may have a single biometric sensor 118. Other embodiments may employ multiple biometric sensors 118. As an option, some biometric sensors 118 may serve more than one purpose.

In some embodiments, the biometric sensor 118 may capture a behavioral characteristic of an individual 108, meaning they observe how the individual 108 does something. Examples include, but are not limited to, gait, signature, keystroke patterns and rhythms when typing on a keyboard, and the like. While behavioral characteristics are not as sharply unique to a person as physiological characteristics, they can be captured easily and, when used in combination with other characteristics, may provide sufficient accuracy to identify the individual 108 with confidence.

In other embodiments, the biometric sensor 118 may capture one or more physiological characteristics of an individual. These characteristics are fundamental to the individual. Examples include, but are not limited to, fingerprints, retinal vascularity shown in a retinal scan, ear shape, vein patterns, facial features shown in a face scan, fiber and color of the iris, cardiac rhythms, and the like. Exemplary biometric sensors 118 include, but are not limited to, infrared thermograms (e.g., detection of veins under skin of hand, face, or other body part), cameras (e.g., images of ear shape, face, iris), 3D scanners or depth-sensitive cameras (e.g., face, hand geometry, etc.), retinal scanner (e.g., for retinal vascularity), heart rate monitor (e.g., to observe cardiac rhythm), and fingerprint/palm reader (e.g., optical, ultrasonic, etc.).

In some embodiments, the token 102 may capture a single biometric reading, while in other embodiments, the token 102 may measure a variety of biometric characteristics, which may be blended into a single value or set of values for using in generating an OTP. Combining multiple biometric signals may allow the use of less expensive hardware while still consistently differentiating between individuals 108.

An important function of the vitality verification system 100 is the determination that the individual 108 associated with a token 102 is, in fact, living. In some embodiments, it is instead desired to determine whether the individual 108 associated with the token 102 is deceased. An embodiment where death is to be verified will be discussed in greater detail with respect to FIG. 5, below.

In some embodiments, vitality determination may be performed as a separate function. In other embodiments, though, vitality determination may be performed at the time a biometric reading is being taken, and may make use of the same biometric sensor 118, or even the same data. In the context of the present description and the claims that follow, "vitality verification" means verifying that a specific individual has a specific and discernable vitality, whether it be alive or dead.

The determination of vitality may be hardware based or software based. In some embodiments, hardware based methods may make use of additional sensors to observe some aspect that isn't captured by the biometric sensor(s) 118. These observations include, but are not limited to, pulse, pulse oximetry, blood pressure (e.g., within a fingertip), electrical impedance, temperature, fine movements of a fingertip surface, and multi-wavelength optical properties. Hardware based methods for determining vitality can be expensive, as they require additional hardware. They are typically invasive in nature and may be circumvented or fooled. For example, the additional hardware may be spoofed to provide the desired readings. Once a circumvention method is determined, that hardware based method is no longer of value.

Software based methods of determining vitality of the individual 108 providing a biometric reading present a number of advantages over hardware based methods, the primary advantage being that they do not require additional sensing hardware beyond what is used to obtain the biometric reading. These methods analyze the biometric data to ascertain the vitality of the source of the data. Some of these methods may be dynamic, meaning they observe variations of the signal across multiple readings (though it sometimes may be performed in a matter of seconds). Examples include observation of the elastic deformation of surface features of a fingerprint, and observation of perspiration while the finger is pressed against the biometric sensor 118.

Other software based methods for determining vitality may be static, utilizing a single biometric reading. Examples include, but are not limited to, observations of the morphology of a fingerprint, examination of fingerprint images in a frequency domain through Fourier analysis, determination of ridge-width in a fingerprint, and other methods used to accurately determine the vitality of the fingerprint source.

Another advantage of the software-based methods for vitality determination is that they may be refined over time through software updates. For instance, machine learning models may continue to improve in accuracy as they train on data sets not available when the system 100 is first rolled out. New and improved methods of detection may be implemented without requiring the replacement of tokens 102 or educating users on new procedures.

It should be noted that, while these examples of vitality determination methods are all centered on using fingerprints as the biometric data, those skilled in the art will recognize that vitality may be determined based on biometric data beyond fingerprints, and that software-based methods may exist for other biometric measurements. For example, the video feed of a face scan can be used to detect the pulse of the individual through barely perceptible fluctuations in the color of their face.

Another specific example of vitality determination using information from a biometric sensor 118 is the observation of pupillary dilation in response to changes in light (e.g., a flash, etc.). Such an observation would pair well with other camera-based readings, such as facial recognition.

It should be noted that some methods of vitality determination are asymmetrical, meaning they are viable for determining only one of the two possible vitalities. For example, observing the pulse of a living individual through subtle color changes in a video feed of their face could be used to verify they are living, but such changes could easily be covered up with makeup to provide a false reading of 'deceased'. In some embodiments, the token 102 may comprise multiple biometric sensors 118 specifically chosen such that the weakness of one sensor 118 is addressed by the strength of another (e.g., pairing the face pulse video scan with a capacitive fingerprint scan, etc.).

As a specific example, in one embodiment the biometric sensor 118 may be a capacitive fingerprint reader, which is able to resolve the valleys and ridges of an individual's 108 fingerprint by observing fluctuations in the voltage detected on a metal plate as the individual drags their finger across. Living biologic tissue is electrically charged; upon death, the skin loses that electric charge within a matter of days. This ensures that, in the event of an individual with benefits passing away, someone else would only be able to falsely provide proof of life for, at most, a single benefit period, such as a month.

That same capacitive fingerprint reader, in another embodiment, could be paired with an optical fingerprint reader to instead verify that the individual is deceased. The optical fingerprint reader functions by taking an image of the fingerprint and analyzing it, similar to taking a fingerprint impression using paper and ink. Optical fingerprint readers function with fingerprints from both living and dead. Combined with the capacitive fingerprint reader, which only functions for living flesh, the pair can be used to verify the subject is dead.

As an option, in one embodiment, these two types of sensors may be combined into a single fingerprint reader having multiple sectors, some optical and others capacitive. Combined, these sectors create a composite biometric reading that verifies both identity and vitality, while only requiring a single fingerprint scan (rather than two scans with two sensors). If the subject is alive, all sectors will provide readings. If the subject is dead, only the optical sectors will detect biometric data for verification.

If a biometric reading is taken, but the source is determined by the token 102 to be unexpectedly non-living, the token 102 may present an error indication to the individual 108 so they may try again or utilize a traditional or backup means for vitality verification. In other embodiments, readings where the determined vitality is not what was expected, whether it be dead or alive, may be transmitted back to the vitality verification server 106 for further observation for signs of fraud (e.g., multiple vitality failures but for various reasons, etc.).

The token 102 also comprises a processor 112 and a memory 114. According to various embodiments, the memory 114 may store various pieces of data that play a role in the generation of a biometric one-time passcode. As shown, this information includes at least one enrollment biometric reading 144, a cryptographic key 146a, a serial number 156 that is unique to that particular token 102, and a unique identifier 158.

In the context of the present description and the claims that follow, an enrollment biometric reading 144 is a biometric reading taken from the individual 108 at the beginning of their participation in a program using the system 100. According to various embodiments, the enrollment biometric reading 144 is taken in the same way, using the same methods and hardware, as the subsequent readings taken using the biometric sensor 118 of the token 102. As will be discussed below, in some embodiments, the enrollment biometric reading(s) 144 may be taken using the biometric sensor(s) 118 of the token 102. In other embodiments, the enrollment biometric reading 144 may be obtained in a different manner that is still reconcilable with the data subsequently taken using the biometric sensor 118 of the token 102. In some embodiments, a token 102 may have enrollment biometric readings 144 from multiple individuals.

The cryptographic key 146a is a value that is used in the generation of the OTP, as is known in the art. In the context of the present description and the claims that follow, a unique identifier 158 is a unique value or data that is associated with a particular individual 108, and that can be used to distinguish them from other individuals making use of the system 100. In some embodiments, where multiple individuals are associated with (i.e., whose vitality can be verified using) the same token 102, the unique identifier 158 may simply be an identifier to distinguish between the individuals associated with a particular device 102, rather than uniquely identify them amongst all individuals within the system 100.

As shown, the token 102 also comprises a first one-time passcode generator 120 (hereinafter "first OTP generator 120"). It should be noted that this generator is referred to as the first OTP generator 120, to distinguish it from the second OTP generator 130 that is found in the server 106. While their ability to generate the same OTP given the same input is crucial to the functioning of the system 100 contemplated herein, in some embodiments they may have different implementations, as will be discussed further, below.

The OTP generator 120 is configured to take biometric data from the sensor 118, the secret cryptographic key 146a (stored in the memory 114 of the token 102), and in some embodiments additional data such as a serial number 156 for the token 102, or GPS coordinates, and then apply a one-way function 148 to render a one-time passcode that could only be derived from that particular set of values, but from which those values cannot be recovered. This seed information that is passed through the one-way function 148 will be referred to as a token message, and will be discussed in greater detail with respect to FIG. 3, below.

Some embodiments may be time-synchronous, meaning the input data includes a timestamp from a first clock module 122. In such a case, the OTP is valid only for a short period of time, after which it expires and will not be verified. Other embodiments, where the token 102 is communicatively coupled to the server 106, the OTP may be challenge based, meaning it incorporates a value sent by the server 106. The actual generation of the OTP typically relies on the application of a one-way function 148, such as a cryptographic hash function, that is impractical (e.g. the computational and time cost far outweighs the value to be gained by reversing the hash) or even computationally intractable to reverse. Those skilled in the art will recognize that other methods may be used to generate a one-time passcode based on seed data. The system, method, and device contemplated herein differs from conventional OTP implementations in that biometric data is incorporated into the passcode generation.

The OTP generated by the token 102 contains information that may be used by the server 106 to identify either the individual 108 or the token 102 that generated the OTP (and thus indicate the individual 108 associated with the token 102). In some embodiments, the first OTP generator 120 may incorporate a value unique to the token 102, such as a serial number 156, that the server 106 may extract and use to look up the associated information to perform the verification. This method may be advantageous in embodiments where communication between the token 102 and the server 106 may require a person to transcribe the OTP. In other embodiments, the first OTP generator 120 may prepend a unique identifier 158 to the start of the passcode that is sent (e.g. "214-908703", where 214 is the unique identifier 158). This unique identifier 158 serves as an index that points directly to a user file 128 stored by the server 106, or at least allows the server to distinguish between user files 128 that may be associated with that individual 108. As an option, the unique identifier 158 may be used in combination with a phone number, in some embodiments.

In some embodiments, the unique identifier 158 may be used in conjunction with a phone number associated with the individual 108. As a specific example, in one embodiment, the unique identifier 158 may be a three digit sequence, which by itself would limit the system to 1000 unique user files. However, when used in combination with a phone number that is associated with a user's file, and that number is visible to the server 106, the three digit unique identifier 158 is sufficient. The use of a short unique identifier 158 would reduce the length of the OTP, making it easier for a user to manually submit to the server 106.

In some embodiments, the first OTP generator 120 may be configured to generate passcodes that are short enough that an individual 108 would not be overwhelmed if they had to type it in, read it out loud, or send it via text message or SMS. In other embodiments, where the token 102 is communicatively coupled to server 106, the token OTP may be longer and/or more difficult (e.g. include punctuation that would be hard to read out loud, etc.).

Once the OTP has been generated by the token 102, it needs to be communicated to the server 106 so it can be verified. This communication is facilitated by the token interface 124. In the context of the present description and the claims that follow, a token interface 124 is a hardware element that, in some way, presents an OTP generated by the token 102 for further use outside of the token 102. In some embodiments, the token interface 124 may be directed for reception by a human. For example, in some embodiments, the token interface 124 may comprise a display 150 or screen to visually convey an OTP to an individual 108, who in turn reports the OTP to the vitality verification server 106 (e.g. using a mobile device 142). This will be discussed further with respect to FIG. 3, below. Other embodiments may employ speakers 152 for relaying the OTP to an individual 108 or through a voice interface 140 of the server 106. Still other embodiments may implement other output devices known in the art, as token interfaces 124.

Figure 1B:
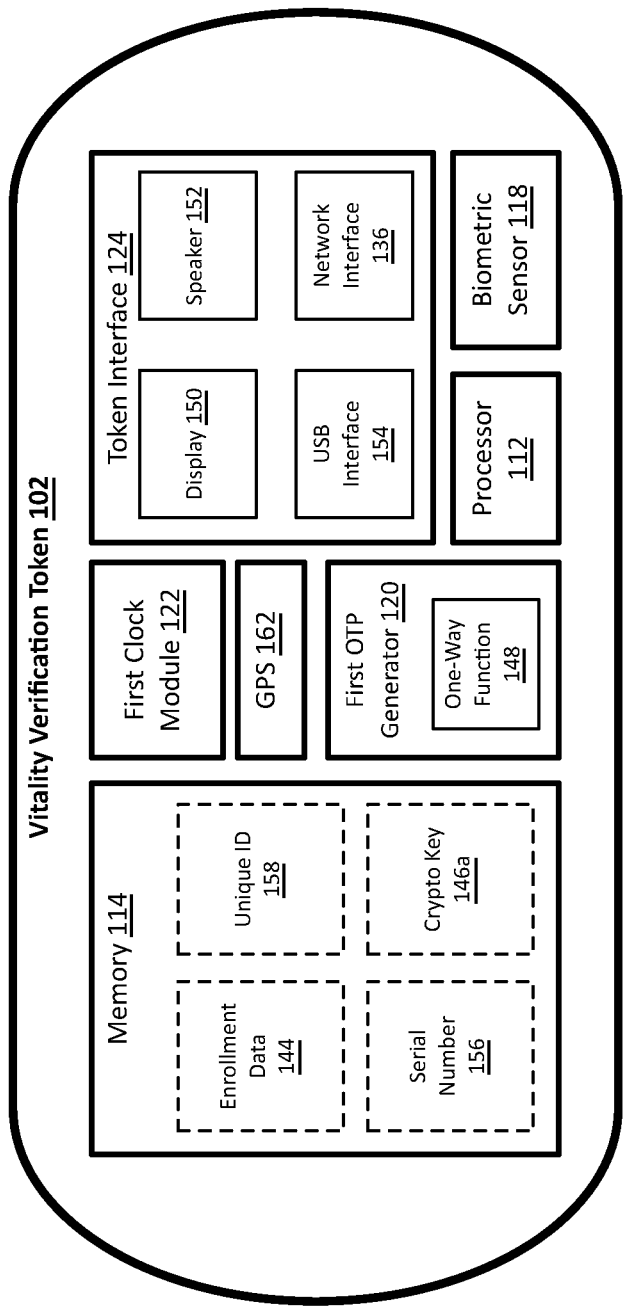
FIG. 1B is a schematic view of a vitality verification token of the system of FIG. 1A.

According to various embodiments, the token interface 124 may be configured for machine-to-machine communication, either directly or through a network 110 (e.g. the Internet, cellular network, etc.). In one embodiment, the token interface 124 may be a conventional network interface 136, such as a Wi-Fi or cellular modem (e.g., the token 102 may comprise a SIM card, etc.), or a wired connection. In other embodiments, the token interface 124 may be configured to connect to an intermediary device that is network enabled (e.g. a Bluetooth connection to a mobile device 142 in communication with the server 106, USB interface 154 for sending OTP to the server 106 upon insertion into a network-enabled computer, etc.). Some embodiments may have more than one token interface 124, as shown in FIG. 1B.

As shown, some embodiments of the token 102 may further comprise a GPS receiver 162. The incorporation of a GPS location into the generation of the token OTP, in addition to biometric data, adds another layer of easily collected data that would further complicate any attempts at fraudulent behavior, particularly on a scale larger than a single beneficiary. For example, should a person or group attain the technological sophistication needed to falsify a biometric signal from a living person, they would also have to spoof a GPS signal, or determine which portion or subset of the GPS location is being fed into the one-way function, for each token 102, further reducing the scalability of any fraudulent endeavors.

Additionally, in some embodiments, the GPS location may be used to determine the location of the token 102 at the time of OTP generation to verify that a location-specific benefit (e.g. disaster relief, revitalization relief, etc.) is being paid to an individual located in the necessary area. Furthermore, in some embodiments, the token 102 may be configured such that it will only generate an OTP once it has determined that the GPS location is within a specified area or geofence.

According to various embodiments, a location may be sent along with the token OTP for verification. In the context of the present description and the claims that follow, a location is a piece of information that indicates, to some degree of specificity, the position of the token 102 on the earth. In some embodiments, the location may be raw GPS coordinates from the GPS receiver 162. In other embodiments, the token 102 may use the coordinates received from the GPS receiver 162 to resolve the location of the token 102 to a desired level (e.g., country, state, county, city, neighborhood, street, etc.). In some embodiments, the location may be resolved to a predefined partitioning of a geographic area (e.g., what3words, etc.).

In some embodiments, the token 102 may be a specialized, single purpose device, like conventional OTP token devices. In such embodiments, the token 102 may resemble a key fob or other small device. In other embodiments, the token 102 may appear as a computer peripheral, like a USB drive that can input the OTP directly into a web interface, or transmit it directly over the network 110 through a socket upon insertion into a computer. As an option, in some embodiments the token 102 may be reusable, or otherwise erasable, allowing the user specific information to be removed and the device reset to pre-enrollment conditions.

In other embodiments, the token 102 may be implemented in a hardware environment that is not single purpose. For example, the token 102 may be implemented on a mobile device 142 such as a smartphone, and may make use of sensors common to many smartphones (e.g. fingerprint scanner, camera, depth-sensing camera, etc.) to perform a biometric scan and vitality determination. The OTP generated by this virtual token 102 may be transmitted directly to the server 106 through the network 110. As an option, in cases where network connectivity through the mobile device 142 is not available, the generated OTP may be presented to an individual 108 to transmit in conventional ways (e.g. phone call, etc.). Implementing a token 102 on a mobile device 142 is advantageous as it lowers the cost of implementing and deploying the system 100. An individual 108 is less likely to lose a mobile device 142 that is used on a regular basis than a small key fob device that may only be used once a month, for example. Additionally, the computing power of a mobile device 142 may facilitate OTP generation that could be too computationally intense for an affordable single-purpose device.

As shown, the enrollment client device 104 comprises a processor 112, a memory 114, and a client network interface 136; some embodiments also comprise one or more biometric sensors 118. The enrollment client device 104 (hereinafter "client device 104") is used to enroll an individual 108 in the vitality verification system 100, so that a token 102 may be associated with and issued to the individual. The client device 104 receives information from the individual 108, and can also initialize a token 102 for use by a particular individual. The enrollment process will be discussed in greater detail with respect to FIG. 3, below.

In some embodiments, the enrollment client device 104 may comprise a biometric sensor 118 to capture and establish an enrollment biometric data 144, to be used by the token 102 for verification. In other embodiments, the client device 104 may instead rely on the token 102 with which it is communicatively coupled, allowing the enrollment biometric data 144 be established using the token sensor 118, which would advantageously account for variations in readings taken by different sensors, and may reduce the error rate for performing verifications and check-ins. Additionally, in some embodiments, the client device 104 also receives from a token 102 it's unique serial number 156, to be transmitted to the server 106 along with the rest of the identifying information needed to create a user file 128 for the individual 108.

According to various embodiments, the client device 104 is able to communicatively couple with the token 102, to obtain the needed information, or to issue information to the token 102, such as a cryptographic key 146a. The network interface 136 of the client device 104 may allow for such communication, as well as communication with the server 106. For example, in one embodiment, the client device 104 may be able to communicate using Bluetooth, as well as connect to a network 110 via Wi-Fi. In some embodiments, the client device 104 may communicate with a token 102 over a wired connection, such as a USB interface, to reduce the cost of the token 102.

In some embodiments, the client device 104 may be a specialized piece of hardware. In other embodiments, it may be implemented in a multi-use hardware environment as software. For example, in some embodiments, the enrollment client device 104 may be a smartphone, a table, a laptop, or desktop computer. Such an implementation has the advantage of not requiring the issuance of new hardware to a benefit-providing agency as part of rolling out the system 100 contemplated herein, but instead just the installation of a piece of software, reducing the cost of implementation in both time and money.

The vitality verification server 106 (hereinafter "server 106") is responsible for maintaining records for each individual 108 and token 102 in use by the system 100, and for verifying the vitality of individuals 108 by generating a server OTP and comparing it to the token OTP received by the server 106. As shown, the server 106 comprises a processor 112 and a memory 114, as well as a second clock module 132 and second OTP generator 130.

According to various embodiments, the second clock module 132 produces substantially the same output as the first clock module 122. However, implementing a system 100 using tokens 102 that are always in sync with the second clock module 132 of the server 106 would needlessly increase the cost of each token 102. Instead, some embodiments of the system 100 and method contemplated herein are able to deal with clock modules that are potentially out of sync. This will be discussed in the context of FIG. 3, below.

As previously mentioned, the first OTP generator 120 of the token 102 and the second OTP generator 130 of the server 106 are identical to the extent that they both apply the same one-way function 148, and produce identical OTPs when given the same input. In some embodiments, they may be literally identical in implementation, in software and/or hardware. However, in other embodiments, the second OTP generator 130 may be implemented in a different manner than the first OTP generator 120 of the token 102. While the token 102 only needs to generate a single OTP for each period of time for which it would be valid, the server 106 may be receiving hundreds or thousands of verification requests simultaneously, and might need to generate one-time passcodes many orders of magnitude faster than a token 102. In some embodiments, the second OTP generator 130 may be implemented on special hardware too expensive to implement in every token 102, such as FPGA or ASIC solutions, or GPU's adapted to evaluate the one-way function 148 much faster than a general purpose CPU or microcontroller used by the token 102.

The server 106 verifies an OTP received through the server interface 134 by matching it with an OTP generated by the server 106 using information stored in a user file 128. According to various embodiments, the user files 128 may be stored in a database 116 communicatively coupled to the server 106, while in other embodiments the user files 128 may be stored within the server 106. In some embodiments, the database 116 may be local to the server 106, while in other embodiments, the database 116 may be discrete, remote, or even cloud based. The user file 128 will be discussed in greater detail with respect to FIG. 2, below.

In addition to the user files 128, in some embodiments, the server 106 may also store a plurality of cryptographic keys 146, each paired with a serial number 156 of the token 102 to which it was assigned. The use of these keys will be discussed further with respect to FIG. 3, below.

The server 106 also comprises at least one server interface 134. Similar to the token interface 124, the server interface 134 facilitates the reception of OTPs generated by tokens 102. In some embodiments, the server interface 134 may comprise a network interface 136, for machine-machine communications through a network 110. For example, in some embodiments, the server 106 communicates with the enrollment client devices 104 over a network 110 through such an interface. In other embodiments, the server interface 134 may also allow for people to provide the OTP using a communication device 142 (e.g. telephone, smart phone, web portal, text message, etc.). Example interfaces include, but are not limited to, SMS 138, USSD, web portals, speech recognition or other voice interface 140, VOIP, direct communication through an app, and the like.

The server interface 134 is also able to communicate with other devices, such as a third party server 160. In some embodiments, the system 100 may be implemented by the agency or entity providing a benefit, and may internalize the release of the benefit to the server 106. In other embodiments, an instruction to release funds in response to verified vitality may be sent to a different server 160 (e.g. a pre-existing or legacy system used by that agency for releasing funds, etc.). In still other embodiments, the system 100 may be implemented across multiple agencies or departments; the receipt of an OTP results in the identification of the individual 108 as well as the party that should be notified upon successful verification of vitality (e.g. IP address for a server 160, web hook, etc.).

In some embodiments, the server 106 may be a single machine. In other embodiments, the server 106 may be implemented across a plurality of machines, operating as one, or in a load-sharing environment. In still other embodiments, the server 106 may be implemented in a shared computing environment through virtualization.

Figure 2:
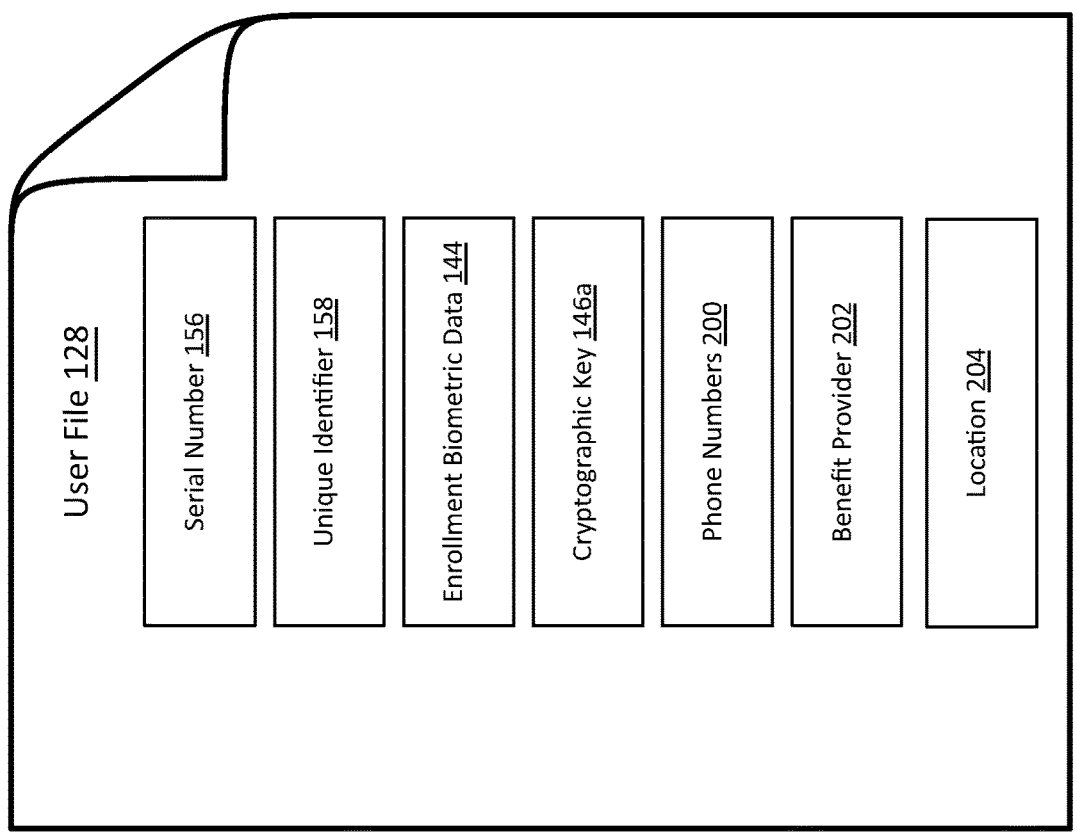
FIG. 2 is a schematic view of a user file.

FIG. 2 is a schematic view of a non-limiting example of a user file 128 stored in the database 116 of the server 106. The user file 128 contains information unique to a token 102 as well as unique to the individual 108 associated with that token 102. This information allows the server 106 to generate an OTP to match the OTP provided by the token 102. It should be noted that, in some embodiments, a single token 102 may be associated with multiple individuals, and therefore multiple user files 128.

As shown, a user file 128 may include a unique identifier 158, which may be used to find the user file 128 associated with an OTP received by the server 106. The user file 128 also comprises data needed to generate the passcode, such as the cryptographic key 146*a*, the serial number 156, and the biometric data 144 obtained during enrollment (hereinafter "enrollment biometric data 144"). According to various embodiments, the user file 128 may also include a phone number 200 unique to the individual 108 being verified, as well as a plurality of secondary phone numbers 200 associated with the individual. In embodiments where an individual 108 can provide their OTP over SMS or a voice call, the system 100 may use the identity of the origination point, in this case the phone number, to identify the proper user file 128. In cases where there are multiple user files 128 associated with the same phone number 200 (e.g., more than one benefit recipient using the same phone line, etc.) or multiple individuals sharing a single token 102 (e.g., in a senior care center, etc.), the unique identifier 158 may be used to zero in on the proper user file 128. In such a case, the unique identifier 158 would only need to be long enough to distinguish between a likely maximum number of individuals 108 making use of the same phone line or token 102.

In some embodiments, this information may be used to quickly identify the proper user file 128 upon receipt of a voice call to report an OTP through the server interface 134. The user file 128 may also include a history of previous verification attempts, both successful and failed. In embodiments of the system 100 providing service to a plurality of agencies or entities, the user file 128 may also identify who to contact upon verification of the vitality of the individual, and how, as previously discussed.

In some embodiments, the user file 128 may also indicate a benefit provider 202. In cases where the vitality verification system 100 is being used to verify the vitality of individuals receiving benefits from more than one agency, the user file 128 may indicate which agency to communicate successful and, in some embodiments, failed verifications, so that funds can be released (or investigations started). In some embodiments, the user file 128 may indicate the identity of the benefit provider, while in others it may simply indicate an IP address or domain name where the server 106 should send a message identifying the individual 108 and information regarding their vitality.

As shown, in some embodiments, the user file 128 may also include a location 202. As previously discussed, a location 202 may be used to ensure that not only is the individual 108 described by the user file 128 the person whose biometric information was just scanned by a token 102, but that their vitality is what it should be for that particular use case (e.g., alive, dead), and that the person with that verified identity had that particular vitality at the expected location (e.g., disaster relief recipient is still in the disaster area and in need of funds set aside for those unable to evacuate, etc.). According to various embodiments, the location 202 may have different levels of specificity, and may be represented in the user file 128 in a variety of ways. Examples include, but are not limited to, GPS coordinates that specify the center of an area having a predefined radius, coordinates defining the vertices of a polygonal geofence, a zip code, a city, a state, a county, a country, a particular partition or partitions of a geographic partitioning scheme (e.g., what3words, etc.), and the like.

Figure 3:
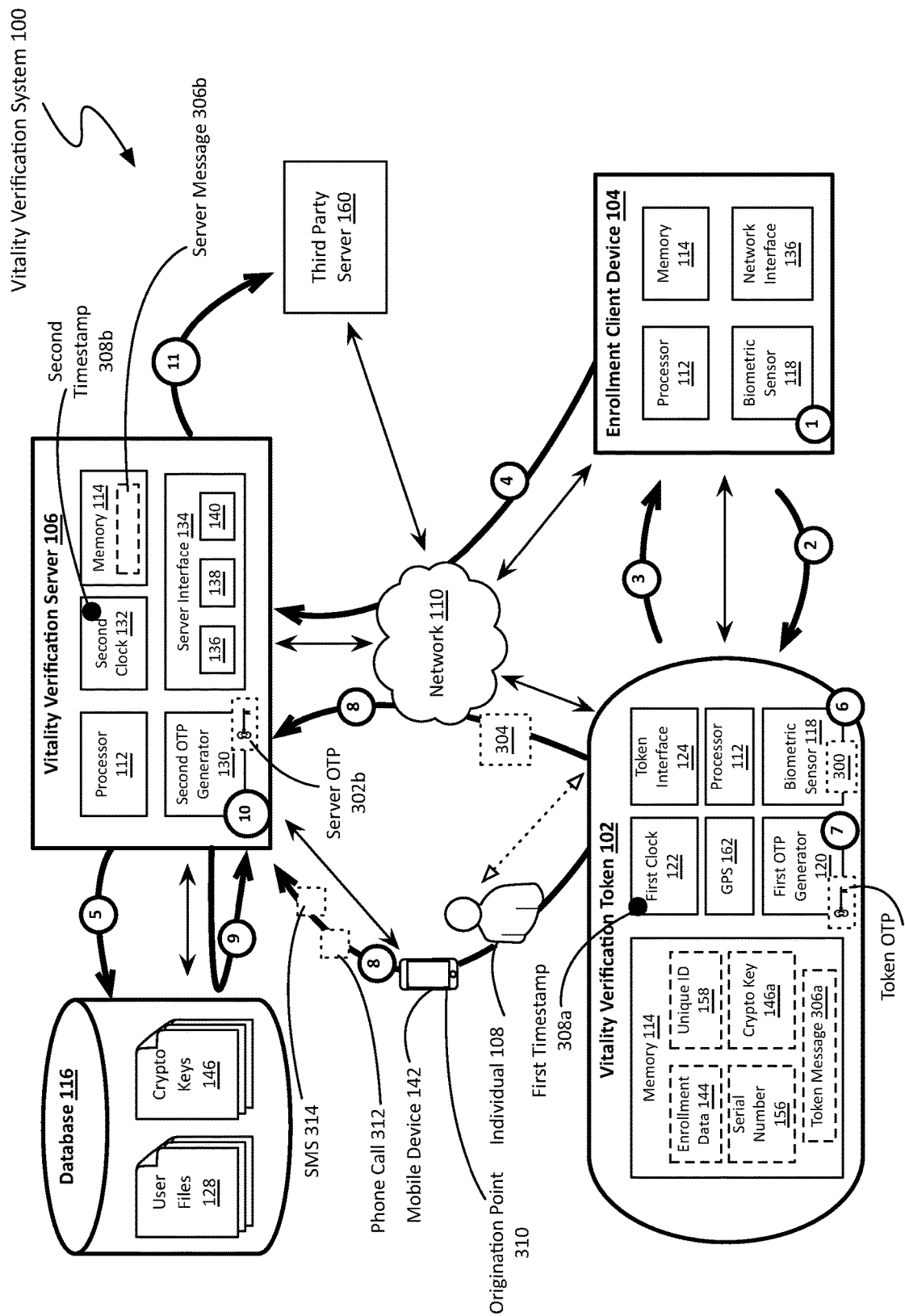
FIG. 3 is a process view of a method for vitality verification using a biometric one-time password within a vitality verification system.

FIG. 3 is a network view of a non-limiting example of a process flow of a method for vitality verification using a biometric OTP. Before the token 102 can start verifying vitality and generating OTPs, the individual 108 must be enrolled in the system 100. Enrollment starts with the capturing of enrollment biometric data 144. See circle '1'. In some embodiments, the enrollment client device 104 may capture this data 144 using its own sensors 118, while in others it may be captured using a token 102 as part of initialization, and then transmitted to the enrollment client device 104.

In some embodiments, multiple pieces or instances of biometric data 144 may be captured from the individual 108. For example, in one embodiment making use of a fingerprint scanner, the prints of multiple fingers may be captured during enrollment, allowing the individual 108 to confirm their vitality using any of their fingers. Such flexibility may be advantageous when the individual 108 is of advanced age, and conditions such as arthritis may progress such that after enrollment, one or more fingers are difficult or painful to place on the sensor 118.

If the enrollment biometric data 144 was captured using a biometric sensor 118 on the client device 104, that data is then sent to a token 102 that is to be assigned to the individual. See circle '2'. The biometric data 144 captured at enrollment will be used to determine if the person being scanned by the token 102 is the individual 108 who is enrolled.

Next, the token 102 sends to the client device 104 information that will be needed by the server 106 to generate an OTP for verification. See circle '3'. This information may include a serial number 156 of the token 102 and a unique identifier 158 (or this may be assigned by the client device 104). In some embodiments the information may also include a cryptographic key 146a inherent to the token 102 (or defined). In other embodiments, the server 106 may retrieve the cryptographic key 146a from a list local to the server 106 using the serial number 156, in cases where the cryptographic key 146a is assigned to the token 102 at the time of manufacture. The list contains the serial numbers 156 and cryptographic keys 146a defined for tokens 102 at the time of manufacture. In embodiments where the enrollment biometric data 144 is obtained using the biometric sensor 118 of the token 102, that is sent to the client device 104 as well.

Other communications between the enrollment client device 104 and the token 102 may include, but are not limited to, software updates, key update (e.g. in case of a compromised cryptographic key, etc.), modification of matching threshold for the biometric data (e.g. how close does the biometric data need to be to the enrollment data to be considered a match, etc.), the length of the OTP validity period, and clock synchronization. In some embodiments, some of this information may also be transmitted to the token 102 after enrollment, using a mobile device 142 associated with the individual 108.

In some embodiments, enrollment takes place using the mobile device 142 as the client device 104, operating in a provisioning mode. The token 102 is used to capture the individual's 108 enrollment biometric data 144, while the individual's information (e.g. name, phone number, etc.) is captured through an application running on the mobile device 142, or is input through a web interface connected to the server 106. In some embodiments, the application facilitates a direct connection between the token 102 and the server 106, bridging the two with a network connection and a Bluetooth connection. The token 102 sends to the server 106, via the client device 104, the enrollment biometric data 144 (or templates). According to various embodiments, the server 106 sends to the token 102, via the client device 104, information that may include, but is not limited to, a cryptographic key 146a, a matching threshold for the biometric data, the OTP validity period, a duration for how long the token 102 display 150 shows an OTP, and the like. In cases of re-enrollment (e.g. the individual 108 has lost their token 102, the token 102 has been damaged, etc.), the server 106 can provide to the token 102 the enrollment data 144 without needing to rescan the individual 108.

The enrollment data (e.g. enrollment biometric data 144, serial number 158, etc.) is packaged and sent to the server 106 by the client device 104, according to various embodiments. See circle '4'. It should be noted that in some embodiments, the role of the client device 104 may be filled by the server 106 itself, either local to the token 102 or remotely, over a network 110.

Upon receipt of the information from the client device 104, the server 106 creates a user file 128 and stores it in a database 116. See circle '5'. This completes the enrollment process.

With respect to the cryptographic keys 146, in some embodiments the key 146a is assigned to the token 102 at the time of manufacture. In some embodiments, the token 102 provides this key as part of the enrollment process, in other embodiments the server 106 may have access to a list of cryptographic keys 146 matched to token serial number 158, ensuring that the cryptographic keys are never sent openly through a network (provided the server 106 gets the list in a secure fashion).

In other embodiments, the server 106 may generate the cryptographic keys 146 itself, and issue them to the tokens 102 as part of the enrollment process. In still other embodiments, the token 102 may have a function that automatically generates a cryptographic key 146a during enrollment, and shares it with the server 106 via the enrollment client 104, or through a direct connection via the network 110, as previously discussed.

Now, once a pay or benefit provisioning period, the individual 108 will need to generate a token OTP 302a using their token 102 so the server 106 can verify that they are still alive, and that funds should be released. This process begins with the individual 108 being scanned by the biometric sensor 118 of the token 102. See circle '6'. The token 102 then compares the token biometric reading 300 with the enrollment biometric data 144 stored in the memory 114. As previously mentioned, in some embodiments, enrollment may capture multiple instances of biometric data 144, such as the fingerprints of more than one of the individual's fingers. The token biometric reading 300 would then be compared against all of the enrollment data 144 to see if any of the captured instances match the current scan (e.g. the individual 108)

In some embodiments, if the result of the comparison is within a predefined tolerance (e.g. 70%, etc.), the reading 300 and the enrollment data 144 will be deemed to match. The predefined tolerance will depend on the particular type or model of biometric sensor 118 being used. Sensors 118 able to give highly consistent readings may be implemented with higher tolerances than sensors 118 that are less reliable. In some embodiments, if the enrollment and current data don't match, an error may be indicated to the individual 108 that they need to try again.

While capturing the biometric data 300, the token 102 also determines whether the source of the biometric data 300 is alive at the time of scanning. According to various embodiments, the determination of vitality may be performed using the scanned data. For example, in cases where the biometric data includes facial recognition with depth sensing cameras, subtle movements and eye gaze can be used to distinguish between a living person and a photo or a mask. In other embodiments, the vitality determination may be performed using the sensor 118 used to capture the data 300, but not the data 300 itself. For example, in embodiments making use of a capacitive fingerprint scanner, the print being scanned must belong to a living individual in order to have the specific type of surface charge needed to register on the capacitive sensor. A deceased or artificial individual would not likely have such a charge. Other methods also include, but are not limited to, detection of pulse and/or respiration through video capture, and the like.

If the scanned biometric data matches the enrollment biometric data 144, the OTP 302a is generated. See circle '7'. According to various embodiments, the token OTP 302a is generated by applying the one-way function to a token message 306a. The token message 306a comprises the cryptographic key 146a specific to that token 102 and individual 108, an enrollment biometric reading 144 (e.g. the enrollment biometric reading 144 that sufficiently matched the biometric reading 300 taken for this instance of vitality verification, a standard biometric reading 144 that will also be used by the server 106 for OTP generation, etc.), and a first timestamp 308a from the first clock module 122 indicating the time the OTP 302a is being generated. In other embodiments, additional data may be included in the token message 306a before being passed through the one-way function 148 to generate the token OTP 302a.

It should be noted that in some embodiments, the enrollment biometric data 144 is converted from the raw data taken from a biometric sensor 118 into a "template", which preserves the unique features in a more concise form allowing for easier storage and processing for comparison and application of the one-way function 148.

According to various embodiments, the OTP 302a is sent by itself to the server 106. However, in other embodiments, including the non-limiting example shown in FIG. 3, the OTP 302a is packaged as part of a token one-time passcode string 304. In the context of the present description and the claims that follow, a token OTP string 304 is a string comprising a token OTP 302a, as well as additional information to assist the server 106 in identifying the proper user file 128, and correctly verifying the OTP 302a. Exemplary data that may be part of the OTP string 304 may include, but is not limited to, the first timestamp 308a, a portion of the first timestamp 308a (e.g. a plurality of digits taken from particular places within the timestamp, etc.), the unique identifier 158, and the like. As an option, these additional pieces of information may be intermixed with the characters making up the OTP 302a, for additional obfuscation.

In some embodiments, particularly embodiments where the OTP 302a is being transmitted to the server 106 directly from the token 102, or from the token 102 to the server via another device as part of a machine-to-machine interface, the OTP string 304 may be lengthy. In other embodiments, where an OTP string 304 may need to be provided to the server 106 with the assistance of the individual 108 or another person (e.g. typed in an SMS message, read aloud over the phone, etc.), it is beneficial to limit the OTP string 304 to a feasible length, or to limit it to characters that are easy to distinguish, both when being read from a display 150 on the token 102, and when spoken to a speech recognition interface 140 of the server 106 (e.g. no punctuation characters, no mixing of zeros and the letter O, etc.). According to some embodiments, the OTP string 304 may be limited to between six and ten characters in length. In other embodiments, the OTP string 304 may be between ten and 14 characters in length. In still other embodiments, the OTP string 304 may be longer than 14 characters.

Upon generation of the OTP 302a, and subsequent formation of the OTP string 304, the token OTP string 304 is then sent to the server 106 through at least one token interface 124. See circle '8'. In some embodiments, that may be done directly through a connection to the network 110, while in other embodiments the OTP string 304 may be relayed to an individual 108 (e.g. via display 150, speaker 152, etc.) who then provides it to the server 106 through a mobile device 142 that is not the token 102.

In some embodiments, this may be done by making a phone call 312 to the voice interface 140 of the server 106. As a specific example, this voice interface 140 could be an automated system with voice prompts and speech recognition that asks the caller to read the OTP string 304 (with the option to provide instructions if needed), read back the received string to verify it was heard correctly. As an option, the voice interface 140 could indicate to the caller whether the provided OTP string 304 was verified by the server 106, or if there was a problem.

In some embodiments, the OTP string 304 may be transmitted to the server 106 through an SMS interface 138. An individual 108 could send an SMS message 314 to the SMS interface 138 containing the OTP string 304, and receive a message back indicating if it was successfully verified by the server 106, or if there was a problem. In some embodiments, the individual 108 may transcribe the OTP string 304, reading it from the display 150 of the token 102 and typing it into a mobile device 142. In other embodiments, the token 102 may be communicatively coupled to the mobile device 142 via a network interface 136 (e.g. Bluetooth, ad-hoc Wi-Fi, local Wi-Fi, etc.), and input the OTP string 304 directly into the mobile device 142 for transmission via SMS (e.g. as part of an application, etc.).

In still other embodiments, the token 102 may send the OTP string 304 to the server 106 over the network 110 by way of the enrollment client device 104, whether that device 104 is simply an application running on a multi-purpose computing device (e.g. laptop, mobile device 142, desktop computer, etc.), or is a piece of specialized hardware.

In some embodiments, where the enrollment client device 104 exists as an application running on a mobile device 142 associated with the individual 108, the client device 104 (again, an application on a mobile device) may function in an operation mode. Upon establishing a connection with the token 102 via a network interface 136 (e.g. Bluetooth, ad-hoc Wi-Fi, local Wi-Fi, etc.), the token 102 passes the OTP string 304 on to the client device 104 to pass on to the server 106, or, in some embodiments, the token 102 sends the OTP string 304 directly to the server 106 via a secure connection through the client device 104, with the client device 104 never seeing the OTP string 304 in plaintext.

In some embodiments, the client device 104 (again, running as an application on the mobile device 142) may send the OTP string 304 to the server 106 through the SMS interface 138 by activating the native SMS application on the mobile device 142, inputting the number for the SMS interface 138 of the server 106, and adding the OTP string 304 to the message field.

Additionally, in some of these embodiments where the token 102 is communicating with the client device 104 or mobile device 142 (or, in some cases, both are the same device), the token 102 may resynchronize the first clock module 122 with a time server on the internet, to avoid errors due to clock drift. This allows the tokens 102 to be built using clock modules that are allowed to drift within the OTP window (discussed below) over a benefit period, usually a month. This means the tokens 102 may be constructed with less expensive clock modules 122, reducing the cost without sacrificing functionality.

Upon receipt of the OTP string 304 through one of the server interfaces 134, the server 106 extracts the additional information (e.g. unique identifier 158, serial number 156, timecode, portion of the timecode, etc.) added to the OTP 302a by the token 102, and uses it to retrieve the appropriate user file 128. See circle '9'. Using the information retrieved, the server 106 then generates a server OTP 302b using that user's data (e.g. enrollment biometric data 144, cryptographic key 146a, etc.), in the same ways as the token 102 generated the token OTP 302a. As previously discussed, while the second OTP generator 130 may be implemented in a different hardware environment, it is applying the same one-way function 148 used by the first OTP generator 120 of the token 102.

In some embodiments, the server interface 134 that receives the OTP string 304 may be able to determine an origination point 310 (e.g. the phone number sending the SMS or voice data, the IP address of a network connection, the MAC address of a device, etc.). In some embodiments, that origination point 310 may be used to locate the appropriate user file 128. As an option, the origination point 310 may be used in conjunction with a unique identifier 158 that is included with the token OTP 302a as part of the OTP string 304.

According to various embodiments, the server OTP 302b is generated using the second OTP generator 130, applying the one-way function 148 to a server message 306b which, like the token message 306a, comprises the cryptographic key taken from the user file 128, the enrollment biometric data 144 taken from the user file 128 and indicated by the OTP string 304 (in cases where there are multiple enrollment data samples, a simple numerical indicator would be enough to indicate which sample to use in the OTP generation), and a second timestamp 308b from the second clock module 132 of the server 106.

According to various embodiments, if the biometric data used to generate the OTP string 304 (i.e. enrollment data 144 that is sufficiently similar to input received by the biometric sensor 118 at the time of verification) matches the biometric data 144 of the user file 128, and the cryptographic keys 146a match as well, then the two generated OTPs will be identical if the timestamps are the same. In some embodiments, the timestamps are rounded to increments of an OTP period (also called a calculation basis), and the time window in which the individual 108 needs to submit the OTP string 304 generated by the token 102 to the server 106 for verification can be equivalent to one or more calculation bases. In some embodiments where the time window is made of multiple calculation bases (e.g. X calculation bases), the server 106 may store the last X OTPs generated, for comparison with incoming OTPs. OTPs generated within the same calculation basis will be identical, and OTPs received within the time window may be validated by the last X OTPs generated by the server, representing the X calculation bases making up the time window. Once the time window has elapsed, the oldest OTP within that window is no longer valid, and another needs to be generated.

A common problem with time-based one-time passcode devices is clock drift. In some embodiments, the server 106 may also generate OTPs 302b for a plurality of immediately preceding time periods to account for delays in the token OTP 302a reaching the server 106 and/or from clock drift.

According to various embodiments, the system 100 and method contemplated herein take advantage of their unique approach to using OTP technology to solve the problem of clock synchronization and clock drift. Conventional OTP applications are typically targeted at two-factor authentication solutions, with generated one-time passcodes expiring in a matter of minutes, if not seconds. In such an implementation, clock drift can quickly become a problem, as well as clock synchronization with the server 106.

In the system 100 contemplated herein, the validation of OTP 302a happens on the timescale of a benefit distribution, typically monthly or biweekly. The validation can happen anytime during that pay period. In many instances, an individual 108 is not able to send the OTP string 304 from their location. As a specific example, in remote African locations, an individual 108 might scan their fingerprint with a token 102 to verify their vitality, and receive an OTP string 304. However, lacking cellular signal at their location, they might have to wait a day or two to travel to the city, or wait for a family member to make the trip and send the SMS message. In such a case, the ability to still validate an OTP 2 or 3 days after generation is very beneficial.

This may be accomplished in embodiments where the calculation basis is measured in days, rather than seconds as is done in conventional OTP systems. For example, if the calculation basis is one day, starting at midnight, then every OTP generated by that individual 108 during that day would be identical. In some embodiments, the token and server may generate their OTPs using the same biometric data (e.g. the index finger), while the token may have multiple biometric readings registered for comparison with sensor data obtained at the time of validation. As a specific example, in one embodiment, the token may have all ten fingers of the individual registered, so they may scan any finger convenient for vitality verification and identity determination. Once the token has confirmed identity and vitality, it generates an OTP to be sent to the server using the right hand index finger, which is the same biometric data the server uses for every OTP generated.

Furthermore, in some embodiments, the OTP generators 120, 130 may operate using reference time, rather than current time. The first clock module 122 and the second clock module 132 are synchronized such that they are both in the same verification window (or calculation basis) at the same time. This means that any time within that window is treated as the same time, chosen by any method but agreed upon by both modules (e.g. both use the beginning of window, both use middle of window, etc.). Since the calculation basis is much longer than typically used in time based OTP system, the use of reference time means any clock drift gets swallowed up in the size of the time window. Additionally, periodic resynchronization with an internet time source, as described above, will further mitigate the problem of clock drift.

Some embodiments make use of some of these approaches. Other embodiments combine a longer calculation basis (e.g. on the order of days, etc.) with the use of reference time, as well as the calculation of OTPs preceding the current reference time, to ensure that a false negative is not issued when verifying an individual's OTP string 304.

The server then compares the token OTP 302a with the server OTP. See circle '10'. If they do not match, the server 106 may communicate with the individual, indicating that a secondary verification is needed. This may be done using conventional methods (e.g. live phone call, visit, etc.), or an alternate electronic method.

If they do match, the individual 108 has been verified to be living. This is communicated to the appropriate party (e.g. third party server 160), so funds can be released. See circle '11'.

Figure 4:
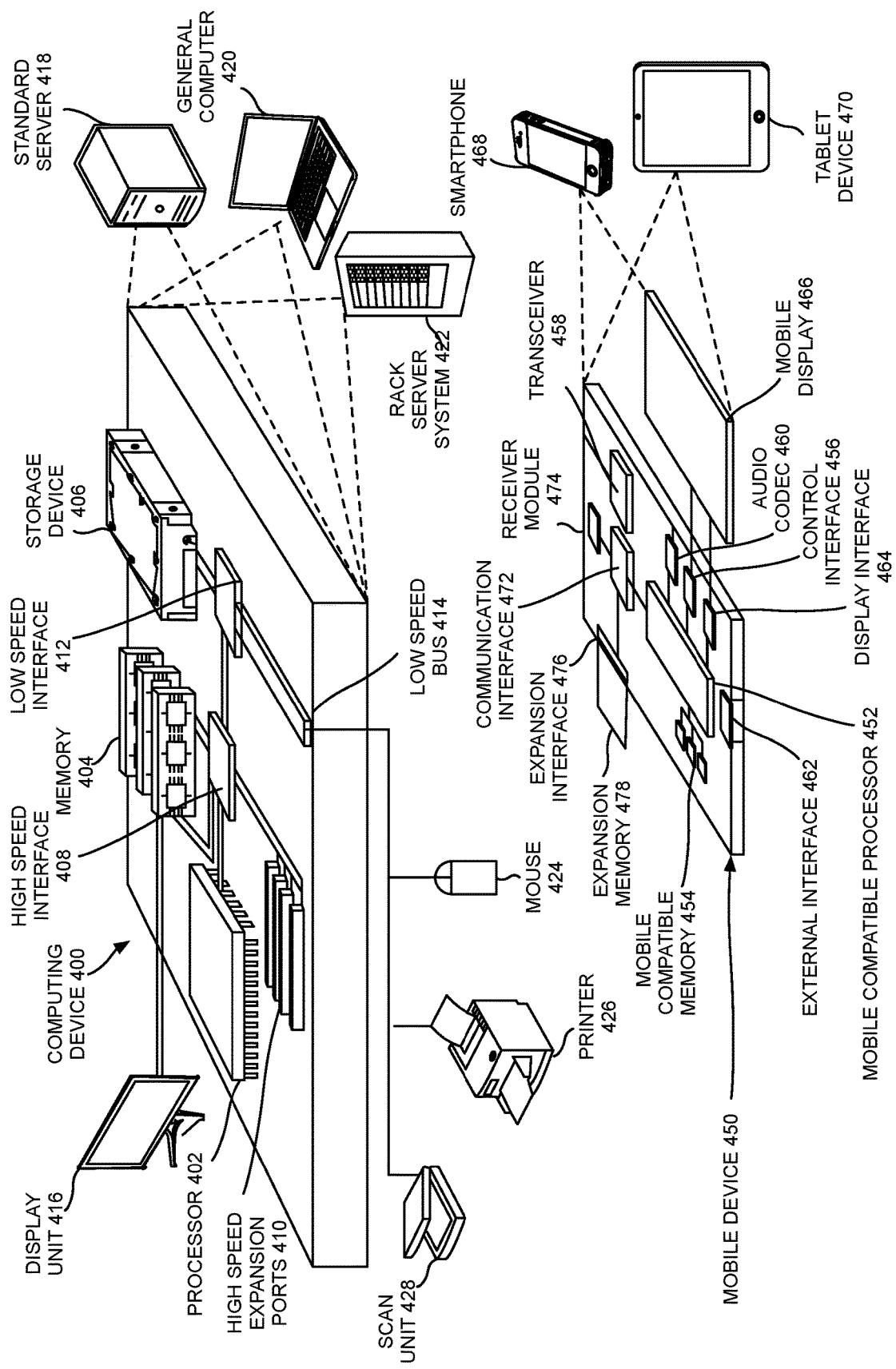
FIG. 4 is a schematic diagram of a specific computing device that can be used to implement the methods and systems disclosed herein, according to one or more embodiments.

FIG. 4 is a schematic diagram of specific computing device 400 and a specific mobile computing device 450 that can be used to perform and/or implement any of the embodiments disclosed herein. In one or more embodiments, vitality verification server 106, enrollment client device 104, database 116, and/or third party server 160 of FIG. 1A may be the specific computing device 400, and mobile device 142 and vitality verification token 102 may be the mobile device 450.

The specific computing device 400 may represent various forms of digital computers, such as laptops, desktops, workstations, personal digital assistants, servers, blade servers, mainframes, and/or other appropriate computers. The specific mobile computing device 450 may represent various forms of mobile devices, such as smartphones, camera phones, personal digital assistants, cellular telephones, tablets, and other similar mobile devices. The components shown here, their connections, couples, and relationships, and their functions, are meant to be exemplary only, and are not meant to limit the embodiments described and/or claimed, according to one embodiment.

The specific computing device 400 may include a processor 402, a memory 404, a storage device 406, a high speed interface 408 coupled to the memory 406 and a plurality of high speed expansion ports 410, and a low speed interface 412 coupled to a low speed bus 414 and a storage device 406. In one embodiment, each of the components heretofore may be inter-coupled using various buses, and may be mounted on a common motherboard and/or in other manners as appropriate. The processor 402 may process instructions for execution in the specific computing device 400, including instructions stored in the memory 404 and/or on the storage device 406 to display a graphical information for a GUI on an external input/output device, such as a display unit 416 coupled to the high speed interface 408, according to one embodiment.

In other embodiments, multiple processors and/or multiple buses may be used, as appropriate, along with multiple memories and/or types of memory. Also, a plurality of specific computing device 400 may be coupled together, with each device providing portions of the necessary operations (e.g., as a server bank, a group of blade servers, and/or a multi-processor system).

The memory 404 may be coupled to the specific computing device 400. In one embodiment, the memory 404 may be a volatile memory. In another embodiment, the memory 404 may be a non-volatile memory. The memory 404 may also be another form of computer-readable medium, such as a magnetic and/or an optical disk. The storage device 406 may be capable of providing mass storage for the specific computing device 400. In one embodiment, the storage device 406 may include a floppy disk device, a hard disk device, an optical disk device, a tape device, a flash memory and/or other similar solid state memory device. In another embodiment, the storage device 406 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 404, the storage device 406, a memory coupled to the processor 402, and/or a propagated signal.

The high speed interface 408 may manage bandwidth-intensive operations for the specific computing device 400, while the low speed interface 412 may manage lower bandwidth-intensive operations. Such allocation of functions is exemplary only. In one embodiment, the high speed interface 408 may be coupled to the memory 404, the display unit 416 (e.g., through a graphics processor and/or an accelerator), and to the plurality of high speed expansion ports 410, which may accept various expansion cards.

In the embodiment, the low speed interface 412 may be coupled to the storage device 406 and the low speed bus 414. The low speed bus 414 may be comprised of a wired and/or wireless communication port (e.g., a Universal Serial Bus ("USB"), a Bluetooth® port, an Ethernet port, and/or a wireless Ethernet port). The low speed bus 414 may also be coupled to the scan unit 428, a printer 426, a keyboard, a mouse 424, and a networking device (e.g., a switch and/or a router) through a network adapter.

The specific computing device 400 may be implemented in a number of different forms, as shown in the figure. In one embodiment, the specific computing device 400 may be implemented as a standard server 418 and/or a group of such servers. In another embodiment, the specific computing device 400 may be implemented as part of a rack server system 422. In yet another embodiment, the specific computing device 400 may be implemented as a general computer 420 such as a laptop or desktop computer. Alternatively, a component from the specific computing device 400 may be combined with another component in a specific mobile computing device 450. In one or more embodiments, an entire system may be made up of a plurality of specific computing device 400 and/or a plurality of specific computing device 400 coupled to a plurality of specific mobile computing device 450.

In one embodiment, the specific mobile computing device 450 may include a mobile compatible processor 452, a mobile compatible memory 454, and an input/output device such as a mobile display 466, a communication interface 472, and a transceiver 458, among other components. The specific mobile computing device 450 may also be provided with a storage device, such as a microdrive or other device, to provide additional storage. In one embodiment, the components indicated heretofore are inter-coupled using various buses, and several of the components may be mounted on a common motherboard.

The mobile compatible processor 452 may execute instructions in the specific mobile computing device 450, including instructions stored in the mobile compatible memory 454. The mobile compatible processor 452 may be implemented as a chipset of chips that include separate and multiple analog and digital processors. The mobile compatible processor 452 may provide, for example, for coordination of the other components of the specific mobile computing device 450, such as control of user interfaces, applications run by the specific mobile computing device 450, and wireless communication by the specific mobile computing device 450.

The mobile compatible processor 452 may communicate with a user through the control interface 456 and the display interface 464 coupled to a mobile display 466. In one embodiment, the mobile display 466 may be a Thin-Film-Transistor Liquid Crystal Display ("TFT LCD"), an Organic Light Emitting Diode ("OLED") display, and another appropriate display technology. The display interface 464 may comprise appropriate circuitry for driving the mobile display 466 to present graphical and other information to a user. The control interface 456 may receive commands from a user and convert them for submission to the mobile compatible processor 452.

In addition, an external interface 462 may be provide in communication with the mobile compatible processor 452, so as to enable near area communication of the specific mobile computing device 450 with other devices. External interface 462 may provide, for example, for wired communication in some embodiments, or for wireless communication in other embodiments, and multiple interfaces may also be used.

The mobile compatible memory 454 may be coupled to the specific mobile computing device 450. The mobile compatible memory 454 may be implemented as a volatile memory and a non-volatile memory. The expansion memory 478 may also be coupled to the specific mobile computing device 450 through the expansion interface 476, which may comprise, for example, a Single In Line Memory Module ("SIMM") card interface. The expansion memory 478 may provide extra storage space for the specific mobile computing device 450, or may also store an application or other information for the specific mobile computing device 450.

Specifically, the expansion memory 478 may comprise instructions to carry out the processes described above. The expansion memory 478 may also comprise secure information. For example, the expansion memory 478 may be provided as a security module for the specific mobile computing device 450, and may be programmed with instructions that permit secure use of the specific mobile computing device 450. In addition, a secure application may be provided on the SIMM card, along with additional information, such as placing identifying information on the SIMM card in a non-hackable manner.

The mobile compatible memory 454 may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 454, the expansion memory 478, a memory coupled to the mobile compatible processor 452, and a propagated signal that may be received, for example, over the transceiver 458 and/or the external interface 462.

The specific mobile computing device 450 may communicate wirelessly through the communication interface 472, which may be comprised of a digital signal processing circuitry. The communication interface 472 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MIMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 458 (e.g., radio-frequency transceiver). In addition, short-range communication may occur, such as using a Bluetooth®, Wi-Fi, and/or other such transceiver. In addition, a GPS ("Global Positioning System") receiver module 474 may provide additional navigation-related and location-related wireless data to the specific mobile computing device 450, which may be used as appropriate by a software application running on the specific mobile computing device 450.

The specific mobile computing device 450 may also communicate audibly using an audio codec 460, which may receive spoken information from a user and convert it to usable digital information. The audio codec 460 may likewise generate audible sound for a user, such as through a speaker (e.g., in a handset smartphone of the specific mobile computing device 450). Such a sound may comprise a sound from a voice telephone call, a recorded sound (e.g., a voice message, a music file, etc.) and may also include a sound generated by an application operating on the specific mobile computing device 450.

The specific mobile computing device 450 may be implemented in a number of different forms, as shown in the figure. In one embodiment, the specific mobile computing device 450 may be implemented as a smartphone 468. In another embodiment, the specific mobile computing device 450 may be implemented as a personal digital assistant ("PDA"). In yet another embodiment, the specific mobile computing device 450 may be implemented as a tablet device 470.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The contemplated systems, methods, and devices will help reduce or eliminate losses due to waste and fraud that occur in programs providing benefits to individuals who are living. These same systems, methods, and devices may also be advantageous (e.g., increase efficiency and speed of program, reduce waste and fraud, etc.) when applied to programs where benefits are contingent on an individual being deceased, according to various embodiments.

For example, in one embodiment, the contemplated system, method, and device may be used to substantiate the demise of an insured individual when making a life insurance claim in circumstances where an official death certificate is unavailable, or when the death occurred in a part of the world lacking a reliable vital statistics registry and/or where such information is easily altered due to corruption. The technologies contemplated herein could greatly speed up a life insurance claim or other benefit contingent on the death of an individual in such circumstances, even when such circumstances are unforeseeable. For example, even in locations where obtaining a death certificate is not normally an issue, events such as natural disasters, war, and pandemics can overwhelm those traditional channels, leaving beneficiaries waiting at a time when they might need those benefits more than ever.

Figure 5:
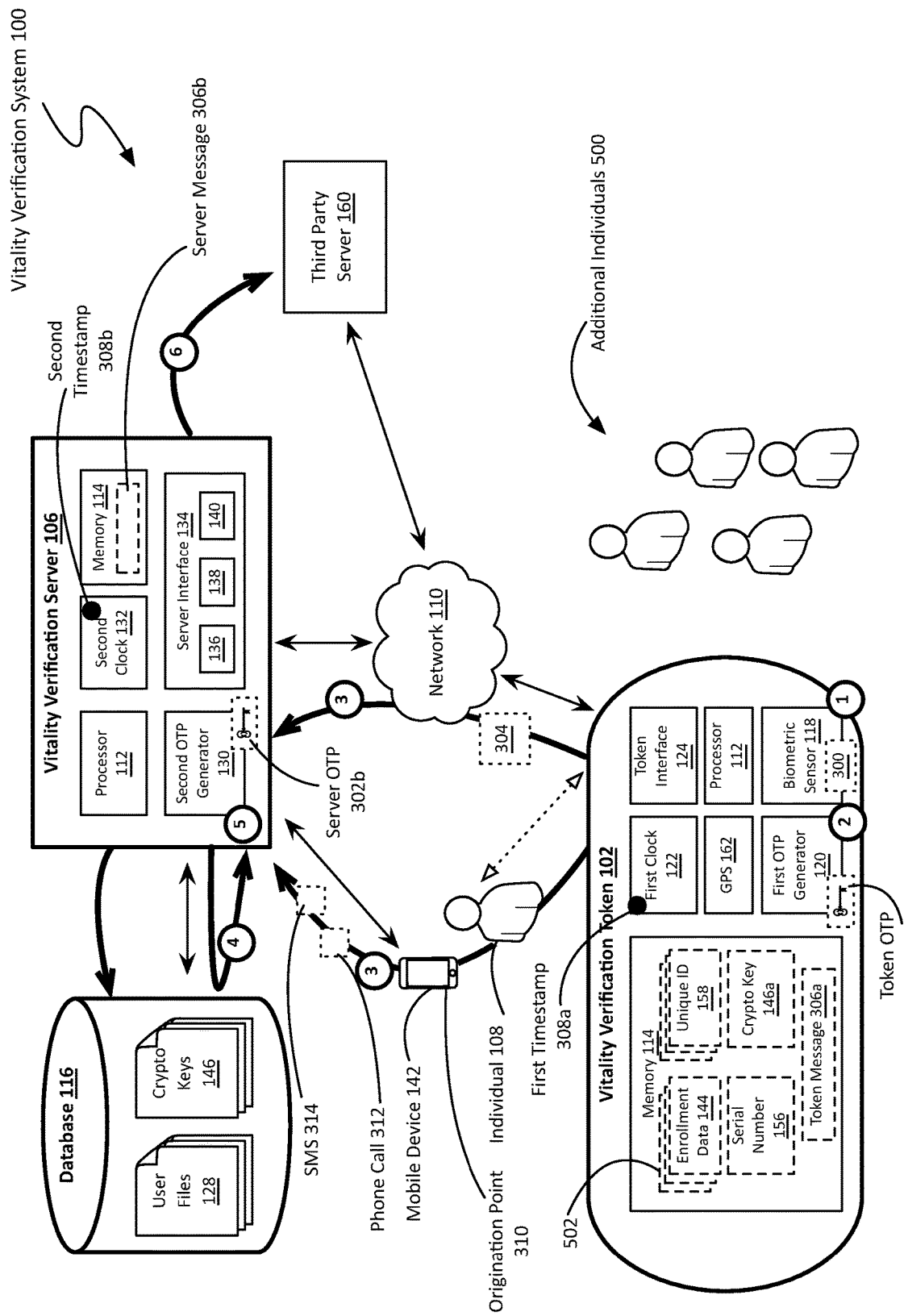
FIG. 5 is a process view of another example of vitality verification using a biometric one-time password within a vitality verification system.

FIG. 5 is a network view of a non-limiting example of a process flow within a system 100 for vitality verification using a biometric OTP. Unlike the non-limiting example shown in FIG. 3, this example involves verifying the death of an individual 108 who is one among a plurality of individuals associated with a single token device 102.

It should be noted that FIG. 5 does not show an enrollment client device 104. As previously discussed, in some embodiments, the system 100 may utilize an enrollment client device 104 to obtain enrollment biometric readings 144, transmit enrollment information to the server 106, and/or obtain identifying information (e.g., serial number 156, etc.) associated with a token 102 and/or individual 108. In other embodiments, that information may be obtained using only the token 102 and a server interface 134 (e.g., a website, an API reachable via mobile or desktop app, etc.). Various embodiments have been discussed concerning different ways the enrollment biometric readings 144 may be obtained and ultimately stored within the memory 144 of the token 102 as well as within a user file 128 stored within the server 106.

Instead, this example begins after enrollment is complete, and the token 102 is being put into use. One variation to note, in this non-limiting example, the token 102 is associated with more than one person. This specific example will focus on the vitality verification of an individual 108 who is one among a plurality of additional individuals 500 associated with the token 102.

Hence, the memory 114 of the token comprises the enrollment biometric reading 144 for the individual 108 as well as a plurality of additional enrollment biometric readings 502, each associated with a different additional individual 500. In some embodiments, where unique identifiers 158 are used, a token 102 associated with multiple individuals may further comprise multiple unique identifiers 158 in its memory.

In a specific example, a natural disaster has struck an area with devastating results. Fatalities have overwhelmed the usual systems for dealing with the clerical work associated with death, such as issuing death certificates. A representative of a life insurance company has a vitality verification token 102 containing the enrollment biometric reading 144 for an individual 108, along with additional enrollment readings 502 for additional individuals 500 who are also insured and living in that area. The insurance company had obtained the biometric data at the time the policies were opened, and transmitted the data to the agent immediately after the disaster struck. The family of the individual 108 is in dire need of resources to get out of the area and begin recovering after the loss of the insured individual 108. Conventional methods would require them to wait until the infrastructure had been repaired to the point that death certificates were once again being issued, which could be a long wait. Using the systems, methods, and devices contemplated herein, things can move much faster, with greater accuracy and less chance of fraud.

First, the token 102 will need to generate a token OTP 302a so the server 106 can verify that the individual 108 is indeed dead, and that funds should be released to the beneficiaries. This process begins with the individual 108 being scanned by the biometric sensor 118 of the token 102. See circle '1'. The token 102 then compares the token biometric reading 300 with the enrollment biometric data 144 stored in the memory 114. As previously mentioned, in some embodiments, enrollment may capture multiple instances of biometric data 144 for a single person, such as the fingerprints of more than one of the individual's fingers, which may be advantageous in situations where the body has sustained damage that could preclude certain methods of identification.

In some embodiments where there are multiple pieces of biometric data in the memory 114 (i.e., multiple individuals associated with same token, multiple readings for single person, etc.), the token biometric reading 300 may simply be compared against all of the enrollment data 144 to see if any of the captured instances match the current scan (e.g., the individual 108). In other embodiments, the token 102 may receive input through a token interface 114 (e.g., a button, a UI, etc.) selecting a particular piece of biometric data (e.g., for a particular individual, for a particular type of reading such as "left index finger", etc.). The comparison is then made between the token biometric reading 300 and the enrollment data 144.

In some embodiments, if the result of the comparison is within a predefined tolerance (e.g., 70%, etc.), the reading 300 and the enrollment data 144 will be deemed to match. The predefined tolerance will depend on the particular type or model of biometric sensor 118 being used. Sensors 118 able to give highly consistent readings may be implemented with higher tolerances than sensors 118 that are less reliable. In some embodiments, if the enrollment and current data don't match, an error may be indicated to the individual 108 that they need to try again.

While capturing the biometric data 300, the token 102 also determines the vitality of the individual 108 at the time of scanning. According to various embodiments, the determination of vitality may be performed using the scanned data. For example, in cases where the biometric data includes facial recognition with depth sensing cameras, subtle movements and eye gaze can be used to distinguish between a living person and a dead person (or a photo or a mask).

In other embodiments, the vitality determination may be performed using the sensor 118 used to capture the data 300, but not the data 300 itself. For example, in embodiments making use of a capacitive fingerprint scanner, the print being scanned must belong to a living individual in order to have the specific type of surface charge needed to register on the capacitive sensor. A deceased or artificial individual would not likely have such a charge. Other methods also include, but are not limited to, detection of pulse, pupillary dilation, and/or respiration through video capture, and the like.

If the scanned biometric data matches the enrollment biometric data 144, the OTP 302a may be generated. See circle '2'. In some embodiments, the token 102 may be configured to seek only one type of vitality, and to only generate an OTP 302a or OTP string 304 in response to determining said vitality. In this specific example, it is unlikely that a life insurance company would ever make use of the system to verify that someone is alive, so it is likely that the token 102 is configured to only generate the OTP 302a in response to determining that the individual 108 is dead, based on the biometric reading 300. In other embodiments, the token 102 may be configured to only generate the OTP 302a or OTP string 304 in response to determining the individual is alive (e.g., verification to continue receiving benefits, etc.). In still other embodiments, the token 102 may be able to operate in both conditions, generating the OTP 302 or OTP string 304 in response to making a determination concerning vitality, whether it be alive or dead (i.e., OTP isn't generated if the token 102 is unable to determine vitality). In such embodiments, the vitality may be incorporated into the token OTP string 304 as a piece of data.

According to various embodiments, the token OTP 302a is generated by applying the one-way function to a token message 306a. The token message 306a comprises the cryptographic key 146a specific to that token 102 and individual 108, an enrollment biometric reading 144 (e.g. the enrollment biometric reading 144 that sufficiently matched the biometric reading 300 taken for this instance of vitality verification, a standard biometric reading 144 that will also be used by the server 106 for OTP generation, etc.), and a first timestamp 308a from the first clock module 122 indicating the time the OTP 302a is being generated. In other embodiments, additional data may be included in the token message 306a before being passed through the one-way function 148 to generate the token OTP 302a.

It should be noted that in some embodiments, the enrollment biometric data 144 is converted from the raw data taken from a biometric sensor 118 into a "template", which preserves the unique features in a more concise form allowing for easier storage and processing for comparison and application of the one-way function 148.

According to various embodiments, the OTP 302a is sent by itself to the server 106. However, in other embodiments, including the non-limiting example shown in FIG. 5, the OTP 302a is packaged as part of a token one-time passcode string 304. In the context of the present description and the claims that follow, a token OTP string 304 is a string comprising a token OTP 302a, as well as additional information to assist the server 106 in identifying the proper user file 128, and correctly verifying the OTP 302a. Exemplary data that may be part of the OTP string 304 may include, but is not limited to, the first timestamp 308a, a portion of the first timestamp 308a (e.g., a plurality of digits taken from particular places within the timestamp, etc.), the unique identifier 158, a location 202, a vitality 504, and the like. As an option, these additional pieces of information may be intermixed with the characters making up the OTP 302a, for additional obfuscation.

In some embodiments, particularly embodiments where the OTP 302a is being transmitted to the server 106 directly from the token 102, or from the token 102 to the server via another device as part of a machine-to-machine interface, the OTP string 304 may be lengthy. In other embodiments, where an OTP string 304 may need to be provided to the server 106 with the assistance of the individual 108 or another person (e.g. typed in an SMS message, read aloud over the phone, etc.), it is beneficial to limit the OTP string 304 to a feasible length, or to limit it to characters that are easy to distinguish, both when being read from a display 150 on the token 102, and when spoken to a speech recognition interface 140 of the server 106 (e.g. no punctuation characters, no mixing of zeros and the letter O, etc.). According to some embodiments, the OTP string 304 may be limited to between six and ten characters in length. In other embodiments, the OTP string 304 may be between ten and 14 characters in length. In still other embodiments, the OTP string 304 may be longer than 14 characters.

Upon generation of the OTP 302a, and subsequent formation of the OTP string 304, the token OTP string 304 is then sent to the server 106 through at least one token interface 124. See circle '3'. In some embodiments, that may be done directly through a connection to the network 110, while in other embodiments the OTP string 304 may be relayed to an individual 108 (e.g., via display 150, speaker 152, etc.) who then provides it to the server 106 through a mobile device 142 that is not the token 102.

In some embodiments, this may be done by making a phone call 312 to the voice interface 140 of the server 106. As a specific example, this voice interface 140 could be an automated system with voice prompts and speech recognition that asks the caller to read the OTP string 304 (with the option to provide instructions if needed), read back the received string to verify it was heard correctly. As an option, the voice interface 140 could indicate to the caller whether the provided OTP string 304 was verified by the server 106, or if there was a problem.

In some embodiments, the OTP string 304 may be transmitted to the server 106 through an SMS interface 138. An individual 108 could send an SMS message 314 to the SMS interface 138 containing the OTP string 304, and receive a message back indicating if it was successfully verified by the server 106, or if there was a problem. In some embodiments, the individual 108 may transcribe the OTP string 304, reading it from the display 150 of the token 102 and typing it into a mobile device 142. In other embodiments, the token 102 may be communicatively coupled to the mobile device 142 via a network interface 136 (e.g., Bluetooth, ad-hoc Wi-Fi, local Wi-Fi, etc.), and input the OTP string 304 directly into the mobile device 142 for transmission via SMS (e.g., as part of an application, etc.).

Upon receipt of the OTP string 304 through one of the server interfaces 134, the server 106 extracts the additional information (e.g., unique identifier 158, serial number 156, timecode, portion of the timecode, etc.) added to the OTP 302a by the token 102, and uses it to retrieve the appropriate user file 128. See circle '4'. Using the information retrieved, the server 106 then generates a server OTP 302b using that user's data (e.g., enrollment biometric data 144, cryptographic key 146a, etc.), in the same ways as the token 102 generated the token OTP 302a. As previously discussed, while the second OTP generator 130 may be implemented in a different hardware environment, it is applying the same one-way function 148 used by the first OTP generator 120 of the token 102.

In some embodiments, the server interface 134 that receives the OTP string 304 may be able to determine an origination point 310 (e.g., a location 202, the phone number sending the SMS or voice data, the IP address of a network connection, the MAC address of a device, etc.). In some embodiments, that origination point 310 may be used to locate the appropriate user file 128. As an option, the origination point 310 may be used in conjunction with a unique identifier 158 that is included with the token OTP 302a as part of the OTP string 304.

According to various embodiments, the server OTP 302b is generated using the second OTP generator 130, applying the one-way function 148 to a server message 306b which, like the token message 306a, comprises the cryptographic key taken from the user file 128, the enrollment biometric data 144 taken from the user file 128 and indicated by the OTP string 304 (in cases where there are multiple enrollment data samples, a simple numerical indicator would be enough to indicate which sample to use in the OTP generation), and a second timestamp 308b from the second clock module 132 of the server 106.

According to various embodiments, if the biometric data used to generate the OTP string 304 (i.e., enrollment data 144 that is sufficiently similar to input received by the biometric sensor 118 at the time of verification) matches the biometric data 144 of the user file 128, and the cryptographic keys 146a match as well, then the two generated OTPs will be identical if the timestamps are the same. In some embodiments, the timestamps are rounded to increments of an OTP period (also called a calculation basis), and the time window in which the individual 108 needs to submit the OTP string 304 generated by the token 102 to the server 106 for verification can be equivalent to one or more calculation bases. In some embodiments where the time window is made of multiple calculation bases (e.g., X calculation bases), the server 106 may store the last X OTPs generated, for comparison with incoming OTPs. OTPs generated within the same calculation basis will be identical, and OTPs received within the time window may be validated by the last X OTPs generated by the server, representing the X calculation bases making up the time window. Once the time window has elapsed, the oldest OTP within that window is no longer valid, and another needs to be generated.

A common problem with time-based one-time passcode devices is clock drift. In some embodiments, the server 106 may also generate OTPs 302b for a plurality of immediately preceding time periods to account for delays in the token OTP 302a reaching the server 106 and/or from clock drift.

According to various embodiments, the systems and methods contemplated herein take advantage of their unique approach to using OTP technology to solve the problem of clock synchronization and clock drift. Conventional OTP applications are typically targeted at two-factor authentication solutions, with generated one-time passcodes expiring in a matter of minutes, if not seconds. In such an implementation, clock drift can quickly become a problem, as well as clock synchronization with the server 106.

In the system 100 contemplated herein, the validation of OTP 302a happens only once per policy, however it may be implemented in circumstances where the usual communication channels are not available (e.g., disasters, etc.), so the timescale may be on the order of days or weeks. The validation can happen anytime during that period. In many instances, an individual 108 or user is not able to send the OTP string 304 from their location. As a specific example, in remote African locations, an individual 108 might scan their fingerprint with a token 102 to verify their vitality, and receive an OTP string 304. However, lacking cellular signal at their location, they might have to wait a day or two to travel to the city, or wait for a family member to make the trip and send the SMS message. In such a case, the ability to still validate an OTP 2 or 3 days after generation is very beneficial.

Furthermore, in some embodiments, the OTP generators 120, 130 may operate using reference time, rather than current time. The first clock module 122 and the second clock module 132 are synchronized such that they are both in the same verification window (or calculation basis) at the same time. This means that any time within that window is treated as the same time, chosen by any method but agreed upon by both modules (e.g., both use the beginning of window, both use middle of window, etc.). Since the calculation basis is much longer than typically used in time based OTP system, the use of reference time means any clock drift gets swallowed up in the size of the time window. Additionally, periodic resynchronization with an internet time source, as described above, will further mitigate the problem of clock drift.

Some embodiments make use of some of these approaches. Other embodiments combine a longer calculation basis (e.g., on the order of days, etc.) with the use of reference time, as well as the calculation of OTPs preceding the current reference time, to ensure that a false negative is not issued when verifying an individual's OTP string 304.

The server then compares the token OTP 302*a* with the server OTP. See circle '5'. If they do not match, the server 106 may communicate with the individual or token user, indicating that a secondary verification is needed. This may be done using conventional methods, or an alternate electronic method.

If they do match, the vitality of the individual 108 has been verified (in this particular case, verified to be deceased). This is communicated to the appropriate party (e.g., third party server 160), so funds can be released. See circle '6'.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

Where the above examples, embodiments and implementations reference examples, it should be understood by those of ordinary skill in the art that other biometric sensors and interfaces could be intermixed or substituted with those provided. In places where the description above refers to particular embodiments of systems and methods for vitality verification, it should be readily apparent that a number of modifications may be made without departing from the spirit thereof and that these embodiments and implementations may be applied to other vitality and/or identity verification technologies as well. Accordingly, the disclosed subject matter is intended to embrace all such alterations, modifications and variations that fall within the spirit and scope of the disclosure and the knowledge of one of ordinary skill in the art.

What is claimed is:

1. A vitality verification token, comprising:
   a biometric sensor configured to obtain a token biometric reading of an individual;
   a first clock module; and
   a memory comprising a cryptographic key and an enrollment biometric reading of the individual, the enrollment biometric reading having been obtained previously through the biometric sensor;
   a first one-time passcode (OTP) generator;
   a token interface; and
   a processor communicatively coupled to the biometric sensor, the first clock module, the memory, the first OTP generator and the token interface, the processor configured to:
      determine, based at least in part on the token biometric reading, if the individual is alive at the time the token biometric reading is obtained;
      compare the token biometric reading with the enrollment biometric reading;
      generate, in response to the token biometric reading matching the enrollment biometric reading and determining that the individual was alive at the time the token biometric reading was obtained, a token OTP string comprising at least a portion of the first timestamp and a token OTP generated by the first OTP generator, the first OTP generator applying a one-way function to a token message comprising the cryptographic key, the enrollment biometric reading, and
      a first timestamp from the clock module; and
      output the token OTP string through the token interface;
   wherein the token OTP string is between six and ten characters in length.

2. The vitality verification token of claim 1, further comprising:
   a GPS receiver communicatively coupled to the processor;
   wherein the processor is further configured to determine a location using the GPS receiver; and
   wherein one of the token OTP string and the token message further comprises the location.

3. The vitality verification token of claim 1:
   wherein the memory further comprises a unique identifier associated with the individual, a plurality of additional enrollment biometric readings, and a plurality of additional unique identifiers, each additional biometric reading and additional unique identifier associated with a different individual from a plurality of additional individuals associated with the vitality verification token;
   wherein the token OTP string further comprises the unique identifier.

4. A vitality verification token, comprising:
   a biometric sensor configured to obtain a token biometric reading of an individual;
   a first clock module; and
   a memory comprising a cryptographic key and an enrollment biometric reading of the individual, the enrollment biometric reading having been obtained previously through the biometric sensor;
   a first one-time passcode (OTP) generator;
   a token interface; and
   a processor communicatively coupled to the biometric sensor, the first clock module, the memory, the first OTP generator and the token interface, the processor configured to:
      determine if the individual is alive at the time the token biometric reading was obtained;
      compare the token biometric reading with the enrollment biometric reading;
      generate, in response to the token biometric reading matching the enrollment biometric reading and determining that the individual was alive at the time the token biometric reading was obtained, a token OTP string comprising a token OTP generated by the first OTP generator, the first OTP generator applying a one-way function to a token message comprising the cryptographic key, the enrollment biometric reading, and a first timestamp from the clock module; and
      output the token OTP string through the token interface.

5. The vitality verification token of claim 4, wherein the determination of whether the individual was alive at the time the token biometric reading was obtained is made based, at least in part, on the token biometric reading.

6. The vitality verification token of claim 4, further comprising:
   a GPS receiver communicatively coupled to the processor;

wherein the processor is further configured to determine a location using the GPS receiver; and wherein one of the token OTP string and the token message further comprises the location.

7. The vitality verification token of claim 4:

wherein the memory further comprises a unique identifier associated with the individual, a plurality of additional enrollment biometric readings, and a plurality of additional unique identifiers, each additional biometric reading and additional unique identifier associated with a different individual from a plurality of additional individuals associated with the vitality verification token;

wherein the token OTP string further comprises the unique identifier.

8. A vitality verification token, comprising:

at least one biometric sensor configured to obtain a token biometric reading of an individual;

a first clock module; and a memory comprising a cryptographic key and an enrollment biometric reading of the individual;

a first one-time passcode (OTP) generator; and a processor communicatively coupled to the biometric sensor, the first clock module, the memory, and the first OTP generator, the processor configured to:

determine, using at least one of the at least one biometric sensor, a vitality of the individual at the time the token biometric reading was obtained, the vitality being one of alive or dead;

compare the token biometric reading with the enrollment biometric reading; and generate, in response to the token biometric reading matching the enrollment biometric reading and determining the vitality of the individual at the time the token biometric reading was obtained, a token OTP string comprising a token OTP generated by the first OTP generator, the first OTP generator applying a one-way function to a token message comprising the cryptographic key, the enrollment biometric reading, and a first timestamp from the clock module.

9. The vitality verification token of claim 8, wherein the processor is further configured to only generate the token OTP string if the individual is determined to be dead.

10. The vitality verification token of claim 8, wherein the processor is further configured to only generate the token OTP string if the individual is determined to be alive.

11. The vitality verification token of claim 8, wherein one of the token OTP string and the token message further comprises the vitality.

12. The vitality verification token of claim 8, further comprising:

a GPS receiver communicatively coupled to the processor;

wherein the processor is further configured to determine a location using the GPS receiver; and wherein one of the token OTP string and the token message further comprises the location.

13. The vitality verification token of claim 8:

wherein the memory further comprises a unique identifier associated with the individual, a plurality of additional enrollment biometric readings, and a plurality of additional unique identifiers, each additional biometric reading and additional unique identifier associated with a different individual from a plurality of additional individuals associated with the vitality verification token;

wherein the token OTP string further comprises the unique identifier.

14. The vitality verification token of claim 8, wherein the token OTP string further comprises at least a portion of the first timestamp.

15. The vitality verification token of claim 8, wherein the token OTP string is between six and ten characters in length.

16. The vitality verification token of claim 8:

wherein the memory of the vitality verification token further comprises a unique identifier associated with the individual; and wherein the token OTP string further comprises the unique identifier.

17. A system for vitality verification, comprising:

a vitality verification token having a processor, a memory, at least one biometric sensor, a first one-time passcode generator, a first clock module, and a token interface, the vitality verification token configured to:

obtain a token biometric reading of an individual through at least one of the at least one the biometric sensor;

compare the token biometric reading with an enrollment biometric reading of the individual, the enrollment biometric reading stored in the memory of the vitality verification token;

determine, using at least one of the at least one biometric sensor, a vitality of the individual at the time the token biometric reading was obtained, the vitality being one of alive or dead;

generate, using the first OTP generator and in response to the token biometric reading matching the enrollment biometric reading and determining the vitality of the individual at the time the token biometric reading was obtained, a token one-time passcode (OTP) string comprising a token OTP generated by applying a one-way function to a token message, the token message comprising a cryptographic key stored in the memory, the enrollment biometric reading, and a first timestamp from the clock module;

a vitality verification server comprising a second one-time passcode generator, a second clock module, and at least one server interface, the vitality verification server configured to:

receive through one of the at least one server interfaces the token OTP string provided by the vitality verification token through the token interface;

generate, using the second OTP generator, a server OTP by applying the one-way function to a server message, the server message comprising the cryptographic key stored in a user file, the enrollment biometric reading stored in the user file, and a second timestamp, the user file retrieved using at least one of a unique identifier associated with the individual and an origination point of the token OTP string; and verify the vitality of the individual by comparing the server OTP with the token OTP.

18. The system of claim 17, wherein the processor is further configured to only generate the token OTP string if the individual is determined to be dead.

19. The system of claim 17, wherein the processor is further configured to only generate the token OTP string if the individual is determined to be alive.

20. The system of claim 17, wherein one of the token OTP string and the token message further comprises the vitality.

21. The system of claim 17:

wherein the vitality verification token further comprises a GPS receiver;

wherein the vitality verification token is further configured to determine a location using the GPS receiver;

wherein one of the token OTP string and the token message further comprises the location; and wherein if the token message comprises the location, the server message comprises the location, the location stored in the user file.

22. The system of claim 17:

wherein the memory further comprises a unique identifier associated with the individual, a plurality of additional enrollment biometric readings, and a plurality of additional unique identifiers, each additional biometric reading and additional unique identifier associated with a different individual from a plurality of additional individuals associated with the vitality verification token;

wherein the token OTP string further comprises the unique identifier.

23. The system of claim 17, wherein the token OTP string further comprises at least a portion of the first timestamp.

24. The system of claim 17, wherein the token OTP string is between six and ten characters in length.

25. The system of claim 17:

wherein the memory of the vitality verification token further comprises a unique identifier associated with the individual; and wherein the token OTP string further comprises the unique identifier.

26. A method for vitality verification, comprising:

obtaining a token biometric reading of an individual through a biometric sensor of a vitality verification token, the vitality verification token comprising a processor, a memory, at least one biometric sensor, a first one-time passcode generator, a first clock module, and a token interface;

comparing the token biometric reading with an enrollment biometric reading of the individual, the enrollment biometric reading stored in the memory of the vitality verification token;

determining, using at least one of the at least one biometric sensor, a vitality of the individual at the time the token biometric reading was obtained, the vitality being one of alive or dead;

generating, using the first OTP generator and in response to the token biometric reading matching the enrollment biometric reading and determining the vitality of the individual at the time the token biometric reading was obtained, a token one-time passcode (OTP) string comprising a token OTP generated by applying a one-way function to a token message, the token message comprising a cryptographic key stored in the memory, the enrollment biometric reading, and a first timestamp from the clock module;

receiving the token OTP string at a vitality verification server through one of at least one server interface of the vitality verification server, the token OTP string provided through the token interface, the vitality verification server further comprising a second one-time passcode generator and a second clock module;

retrieving a user file associated using at least one of the token OTP string and an origination point of the token OTP string, the user file comprising the cryptographic key and the enrollment biometric reading;

generating, using the second OTP generator, a server OTP by applying the one-way function to a server message, the server message comprising the cryptographic key stored in the user file, the enrollment biometric reading stored in the user file, and a second timestamp;

verifying the vitality of the individual by comparing the server OTP with the token OTP.

27. The method of claim 26, wherein the token OTP string is only generated if the individual is determined to be dead.

28. The method of claim 26, wherein the token OTP string is only generated if the individual is determined to be alive.

29. The method of claim 26, wherein one of the token OTP string and the token message further comprises the vitality.

30. The method of claim 26, further comprising:

determining a location through a GPS receiver of the vitality verification token;

wherein one of the token OTP string and the token message further comprises the location; and wherein if the token message comprises the location, the server message comprises the location, the location stored in the user file.

31. The method of claim 26:

wherein the memory further comprises a unique identifier associated with the individual, a plurality of additional enrollment biometric readings, and a plurality of additional unique identifiers, each additional biometric reading and additional unique identifier associated with a different individual from a plurality of additional individuals associated with the vitality verification token;

wherein the token OTP string further comprises the unique identifier; and wherein the user file is retrieved using the unique identifier.

32. The method of claim 26, wherein the token OTP string further comprises at least a portion of the first timestamp.

33. The method of claim 26, wherein the token OTP string is between six and ten characters in length.

34. The method of claim 26:

wherein the memory of the vitality verification token further comprises a unique identifier associated with the individual;

wherein the token OTP string further comprises the unique identifier; and wherein the user file is retrieved using the unique identifier.

* * * * *